United States Patent [19]

Yarr et al.

[11] Patent Number: 5,389,844
[45] Date of Patent: * Feb. 14, 1995

[54] LINEAR ELECTRODYNAMIC MACHINE

[75] Inventors: George A. Yarr, Ballston Spa; John A. Corey, Melrose, both of N.Y.

[73] Assignee: Clever Fellows Innovation Consortium, Inc., Melrose, N.Y.

[*] Notice: The portion of the term of this patent subsequent to Sep. 8, 2009 has been disclaimed.

[21] Appl. No.: 923,055

[22] Filed: Jul. 31, 1992

Related U.S. Application Data

[63] Continuation-in-part of Ser. No. 610,170, Nov. 6, 1990, Pat. No. 5,146,123, Ser. No. 609,811, Nov. 6, 1990, Pat. No. 5,139,242, and Ser. No. 918,904, Jul. 22, 1992, abandoned, which is a continuation of Ser. No. 749,273, Aug. 26, 1991, abandoned.

[51] Int. Cl.⁶ ............................................. H02K 33/00
[52] U.S. Cl. ......................................... 310/15; 310/13; 310/152
[58] Field of Search ....................... 310/12, 13, 14, 15, 310/20, 23, 28, 30, 36, 37, 38, 156, 257, 263; 318/135; 60/910

[56] References Cited

U.S. PATENT DOCUMENTS

| | | | |
|---|---|---|---|
| 3,312,842 | 4/1967 | Heuchling et al. | 310/17 |
| 3,643,117 | 2/1972 | Alger et al. | 310/17 |
| 3,772,540 | 11/1973 | Benson | 310/14 |
| 4,217,507 | 8/1980 | Jaffe et al. | 310/12 |
| 4,346,318 | 8/1982 | Shtrikman | 310/12 |
| 4,349,757 | 9/1982 | Bhate | 310/15 |
| 4,543,502 | 9/1985 | Jarret et al. | 310/15 |
| 4,578,604 | 3/1986 | Eilertsen | 310/30 |
| 4,602,174 | 7/1986 | Redlich | 310/15 |
| 4,607,197 | 8/1986 | Conrad | 318/115 |
| 4,623,808 | 11/1986 | Beale et al. | 310/15 |
| 4,675,563 | 6/1987 | Goldowsky | 310/15 |
| 4,721,873 | 1/1988 | Stenudd | 310/12 |
| 4,814,650 | 3/1989 | Curwen et al. | 310/22 |
| 4,827,163 | 5/1989 | Bhate et al. | 310/15 |
| 4,937,481 | 6/1990 | Vitale | 310/15 |
| 4,994,698 | 2/1991 | Kliman et al. | 310/81 |
| 5,055,731 | 10/1991 | Nihei et al. | 310/309 |
| 5,139,242 | 8/1992 | Yarr | 267/160 |
| 5,146,123 | 9/1992 | Yarr | 310/15 |

FOREIGN PATENT DOCUMENTS

| | | | |
|---|---|---|---|
| 805924 | 8/1960 | Canada | 322/2 |
| 54-19108 | 2/1979 | Japan. | |

Primary Examiner—Steven L. Stephan
Assistant Examiner—D. R. Haszko
Attorney, Agent, or Firm—Alan R. Loudermilk

[57] ABSTRACT

A linear electrodynamic machine is disclosed having non-axisymmetric, interdigitating interfaces between moving and fixed magnetic circuit elements. The moving magnet elements may be of permanent magnet or electromagnetic construction, and in one embodiment constitute low reluctance elements moving relative to fixed energizing and output coils. Magnetic elements on a reciprocating plunger couple to fixed elements of a magnetic circuit in an interdigitating manner. Alternators and motors with non-axisymmetric, interdigitating interfaces are disclosed.

33 Claims, 16 Drawing Sheets

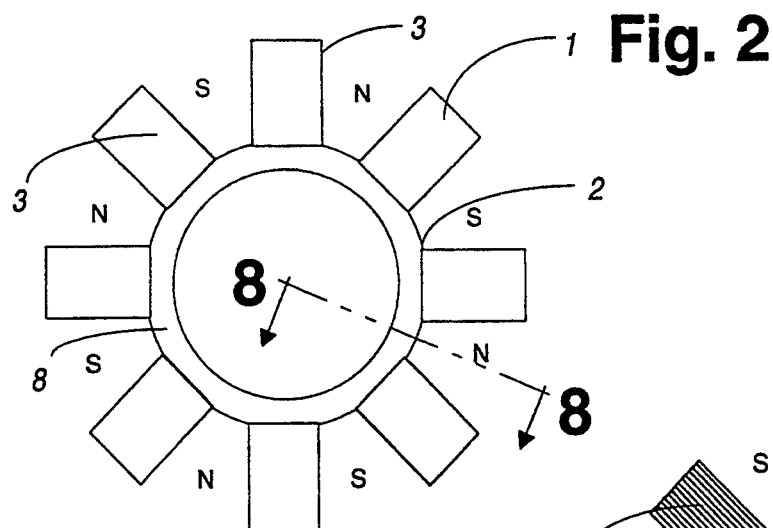
Fig. 2
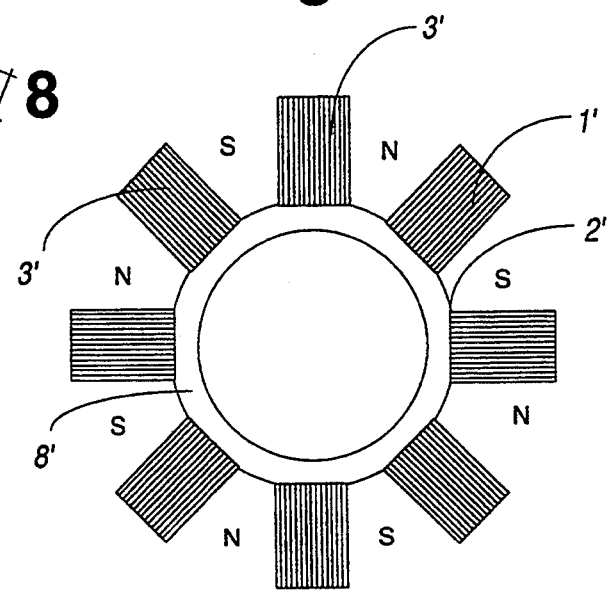
Fig. 2a
Fig. 3
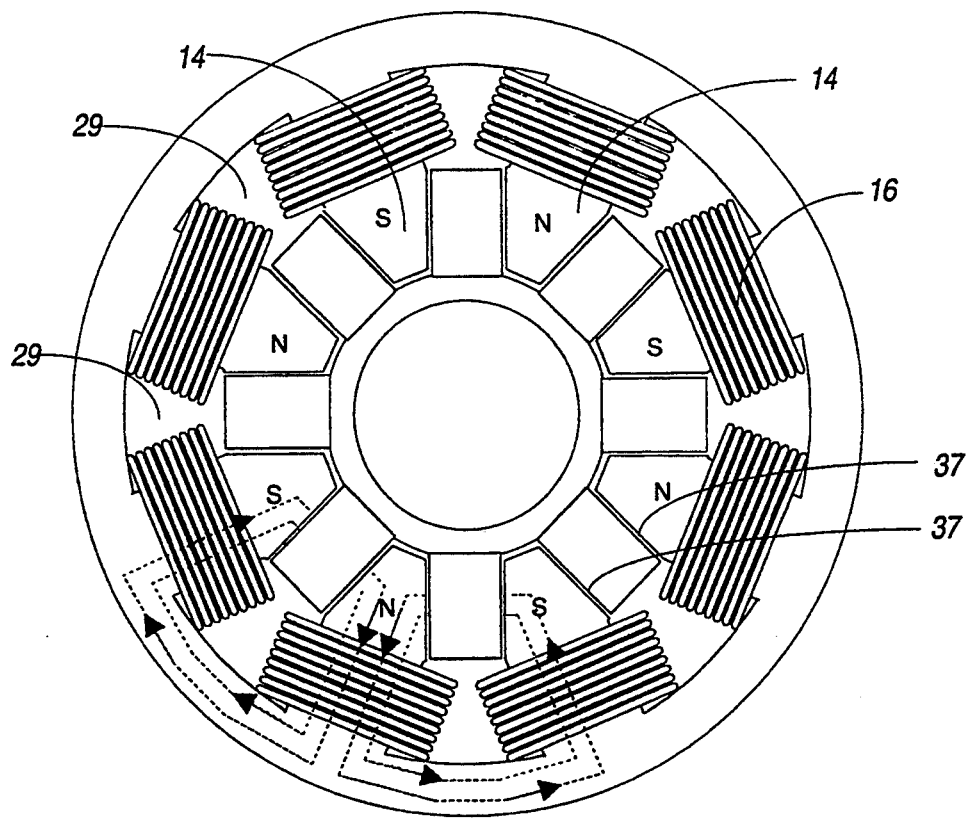

Fig. 20
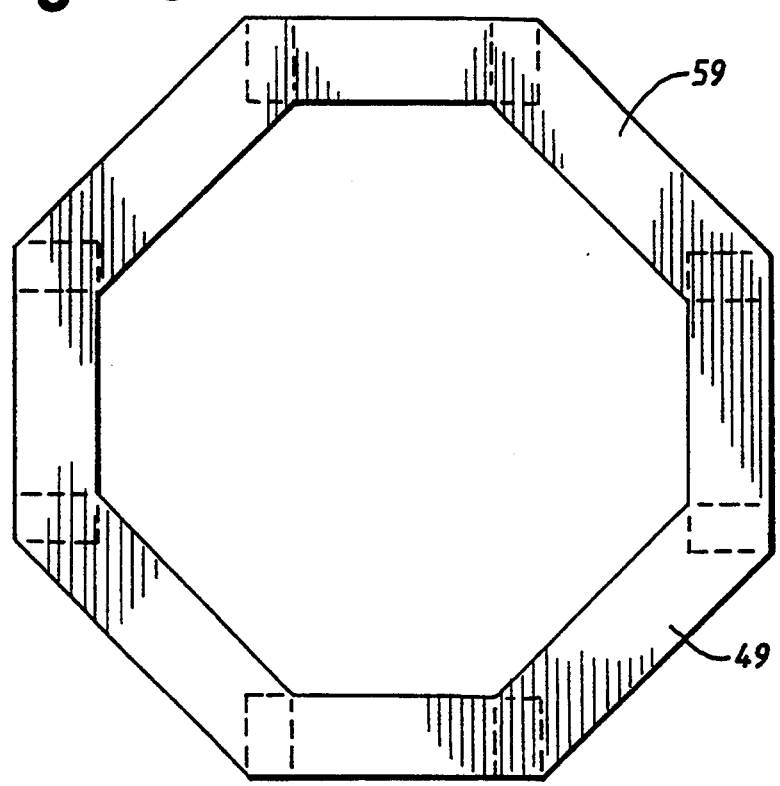
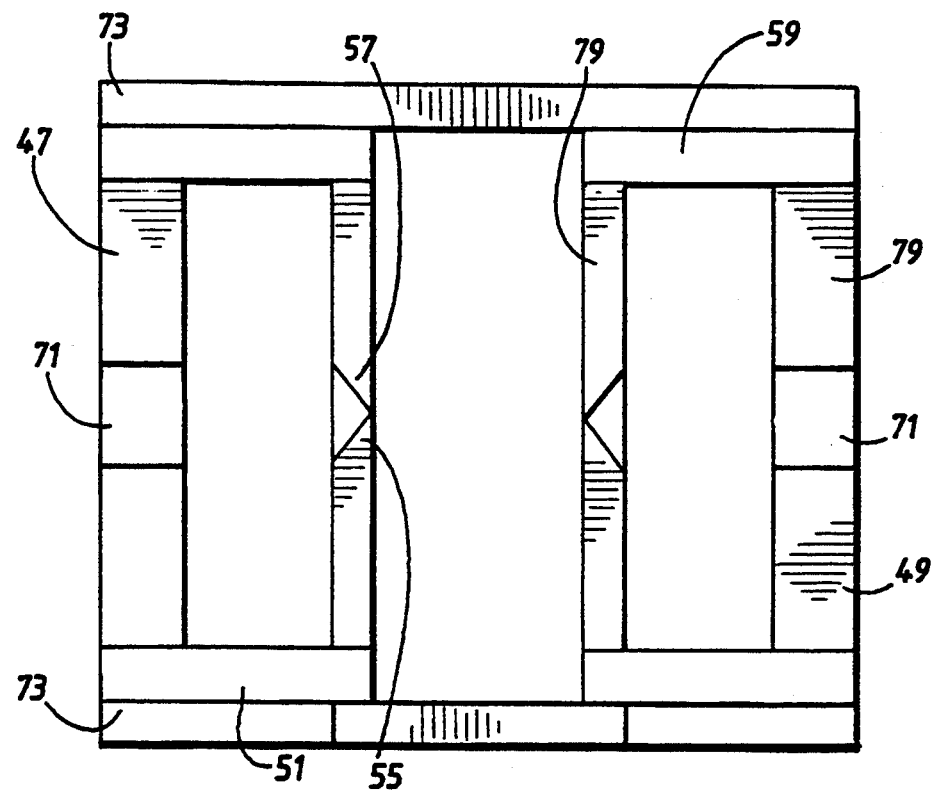
Fig. 21

LINEAR ELECTRODYNAMIC MACHINE

RELATED APPLICATIONS

This application is a continuation-in-part of the following: U.S. application Ser. No. 07/610,170, filed Nov. 6, 1990, now U.S. Pat. No. 5,146,123; U.S. application Ser. No. 07/609,811, filed Nov. 6, 1990, now U.S. Pat. No. 5,139,242; and U.S. application Ser. No. 07/918,904, filed Jul. 22, 1992, now abandoned, which is a continuation of U.S. application Ser. No. 07/749,273, filed Aug. 26, 1991, now abandoned.

BACKGROUND OF THE INVENTION

1. Field Of The Invention

The present invention relates to linearly reciprocating electrodynamic motors and alternators, and more particularly to linearly reciprocating electrodynamic motors and alternators having non-axisymmetric, interdigitating interfaces between moving and fixed magnetic circuit elements.

2. Description of the Prior Art

It is known in the art that moving flux fields in proximity to iron laminations surrounded by conductive coils will induce an electric field in, and corresponding voltage across, the conductive coils as a result of flux variations within the laminations, such as occurs in what are commonly known as alternators. Similarly, it is known that varying electrical current in conducting coils can be used to produce varying flux fields that are in turn used to produce mechanical movement (such as rotation or linear motion) of an appropriate magnetic member in proximity to the varying flux fields, such as occurs in what are commonly known as motors.

Alternators and motors in which the principal motion is along a single axis or line often are referred to as "linear" alternators and motors. Various applications for such linear alternators and motors are known in the art.

One application for a linear alternator is to be coupled to the piston of a Stirling engine. It is known to provide for hermetic sealing of high-pressure Stirling engines by incorporating a power conversion device, such as a linear electric alternator driven by the engine piston, within the pressure vessel. Such linear alternators are directly actuated by the reciprocation of the piston in order to avoid any intermediate linkages and the attendant need for lubrication, since lubricants typically must not be used within the pressure vessel of a Stirling engine.

In the past, such linear alternators have been constructed in substantially axisymmetric form, such that their operation was independent of the angular position of the plunger. This has been required with the commonly-used fluid-film, typically gas, bearings between the reciprocating plunger/piston and fixed supports. Such bearings require extremely close clearance fits, which are difficult in any shape, but are most readily achieved in circular form. Such axisymmetry to the piston/plunger typically precludes any non-sliding connections, it being unrestrained except to one axis and thereby allowing movement such as rotation. Sliding contacts are to be avoided in most applications for such machines in that rubbing surfaces would tend to prematurely wear out, and the desired long service life would not be achieved.

Electrically, this tends to constrain the moving magnetic flux generators on the plunger to be constructed of permanent magnets, typically in the form of annular rings or the like, requiring no electrical energization to create the moving magnetic flux fields. In such prior machines, the plunger typically must be round in section, and as a result permanent magnets must be specially shaped to fit such circular shape. In addition, for a given stroke and magnetic strength, the perimeter of the magnet ring usually is the limiting feature dimension for determining output power, forcing machines of large power output to be large in diameter, to the detriment of mass and structural rigidity.

With reference to FIG. 1, a typical permanent magnet linear alternator/motor machine of conventional design will be described.

As shown in the cross-sectional view of FIG. 1, all components are substantially axisymmetric around the indicated center axis. Four rings of permanent magnet material $1a$ and $1b$ are axially arrayed in cylindrical plunger assembly 8. Plunger assembly 8 comprises magnet rings $1a$, and $1b$, spacer ring(s) 2 of material with low magnetic permeability, and piston 7. Magnet rings $1a$ and $1b$ are spaced in axially-adjacent pairs of opposite magnetic polarity as illustrated, and the axial extent of each ring is substantially equal to the reciprocation stroke of plunger assembly 8. At the mid-stroke position of plunger assembly 8, the magnet ring pairs $1a$ and $1b$ are centered in gaps in a toroidal flux path defined by inner and outer radial magnetically-permeable lamination plates 4' and 4, respectively. A coil of electrically-conductive wire 5 is wound inside magnetically-permeable plates 4 that comprise part of the toroidal flux circuit. Plunger assembly 8 is supported and positioned for reciprocation by a sliding bearing 9 in support frame 6.

In operation, plunger assembly 8 moves alternately to either end of its stroke, bringing alternately the upper and lower members of each magnet ring pair $1a/1b$ into alignment with the gap in the toroidal, magnetically-permeable path defined by inner and outer radial lamination plates 4' and 4. Coil 5 thus is alternately surrounded (and linked with) a reversing magnetic flux in lamination plates 4' and 4. This flux induces alternating voltage in coil 5 according to known electromagnetic principles. When an electrical load is attached to the ends of coil 5, a current is enabled to flow, producing power.

Alternatively, an alternating electric current can be passed through coil 5, inducing a reversing magnetic flux in laminations 4 and 4', thereby causing plunger magnet rings $1a/1b$ to align alternately with the lamination flux direction. Since axially adjacent magnet rings $1a$ and $1b$ are of opposite polarity, reciprocation of plunger assembly 8 results as rings $1a$ having polarity which reinforces the flux in laminations 4 and 4' alternately align and then are expelled in favor of opposite-polarity rings $1b$ when the electrically-induced flux reverses, and vice versa.

The end result of such prior art machines is, however, that, in the case of an alternator, the alternator and its bearings typically constitute more than half the size and weight, and up to half the cost of a Stirling engine and linear alternator assembly. Similar disadvantages result when such prior machines are configured to be operative as a linear motor.

SUMMARY OF THE INVENTION

The present invention overcomes disadvantages of prior art linear alternators and motors by providing a configuration in which a non-axisymmetric, interdigitating interface between moving and fixed magnetic circuit elements is utilized instead of an interface utilizing moving annular axisymmetric permanent magnets or the like. The moving magnetic elements may be of permanent magnet or electromagnetic construction, and in one embodiment constitute a low-reluctance element moving relative to fixed energizing and output coils.

Within the scope of the present invention are the systems disclosed in copending application Ser. Nos. 07/610,170 and 07/609,811. In application Ser. No. 07/610,170, a permanent magnet alternator with a "star" shaped plunger is disclosed, which utilizes permanent magnets that interdigitate with the output coils and eliminates many of the problems inherent in the axisymmetric type permanent magnetic machines. With such a permanent magnet machine in accordance with the present invention, magnets may be positioned directly between two adjacent faces of the fixed magnetic circuit, with little opportunity for leakage, thereby producing very high linkage of the generated flux with the output coils around the fixed magnetic circuit. High linking effectiveness tends to minimize the required permanent magnet strength and therefore size required for a given output power.

In application Ser. No. 07/609,811, a suspension system is disclosed that is particularly useful with the type of alternator that is disclosed in application Ser. No. 07/610,170. The disclosed suspension system eliminates the freedom for the plunger to rotate while reciprocating, thus allowing non-axisymmetric, interdigitating interfaces between plunger and fixed parts without rubbing. In the disclosed suspension system, costly gas bearings are replaced with flexible elements between the fixed parts and plunger. Application Ser. Nos. 07/610,170 and 07/609,811 are incorporated herein by reference.

Also in accordance with the present invention, electromagnetically-generated moving flux may be utilized, either with electromagnets mounted on the plunger in place of permanent magnets, or with electrically energized coils mounted on the fixed parts together with the output coils, and low-reluctance moving iron on the plunger used to alternately link the output coils to energizing coils of opposite polarity as the plunger reciprocates. Such fixed coil embodiments provide advantages over embodiments with plunger mounted electromagnets in that reliability and durability typically are increased. In such embodiments in which "flying coils" are not utilized, the chances of wire breakage or disconnection are lessened, although this advantage comes at the cost of an increase in the mass and size of iron and copper required compared to comparable flying coil designs, which allow less leakage of the exciting flux.

In co-pending application Ser. No. 07/749,273, which is incorporated herein by reference, such an alternator is disclosed that provides for a non-axisymmetric, interdigitating plunger mounted on a flexible suspension, wherein energizing coils are mounted on the fixed parts, but surround elements of the plunger in a manner that provides magnetic poles thereon which interact with the fixed parts to produce electric output. This approach eliminates the need for moving coils and permanent magnet materials, and provides for additional controllability through the external variation of the current in the energizing coils, and thereby of the resultant moving magnetic field.

As will be apparent to those in the art, the present invention provides for improved electrodynamic linear power convertors having non-axisymmetric, interdigitating interfaces between moving and fixed magnetic circuit elements, which are particularly useful in systems with flexible suspensions. The present invention is applicable to alternators or motors utilizing either permanent magnet or electromagnetic excitation. With embodiments utilizing electromagnetic excitation, additional controllability and reduced mass and size are obtainable relative to prior art flux-switching electromagnetic units. With the present invention it is possible to obtain the lower size and mass advantages of permanent magnet alternators/motors, and the controllability and lower cost (resulting from no permanent magnet materials) of the electromagnetically-excited alternators/motors, together in a single machine.

Accordingly, is an object of the present invention to provide improved magnetically-excited or electromagnetically-excited power convertors such as alternators or motors, having non-axisymmetric, interdigitating magnetic circuit elements.

It is a further object of the present invention to provide electromagnetically-excited power convertors enabling modulation of electrical or mechanical output by variation of the exciting currents, while having a magnetic circuit of low leakage and high linking effectiveness, thereby combining the small size and low mass generally available only in permanent magnet machines, with the lower cost materials and controllability of electromagnetically-excited machines.

BRIEF DESCRIPTION OF THE DRAWINGS

The above-mentioned features and objects of the present invention will become more apparent by reference to the following description taken in conjunction with the accompanying drawings, in which:

FIG. 2 is an end view of a permanent magnet star plunger in accordance with the present invention;

FIG. 2a is an end view of a electromagnetic star plunger in accordance with the present invention;

FIG. 3 is an end view of the alternator/motor assembly in accordance with an embodiment of the present invention;

FIG. 20 is a top view of a reciprocating plunger in accordance with the embodiment of the present invention illustrated in FIG. 18;

FIG. 21 is a side view of a reciprocating plunger in accordance with the embodiment of the present invention illustrated in FIG. 18;

DETAILED DESCRIPTION OF THE INVENTION

Figure 1:
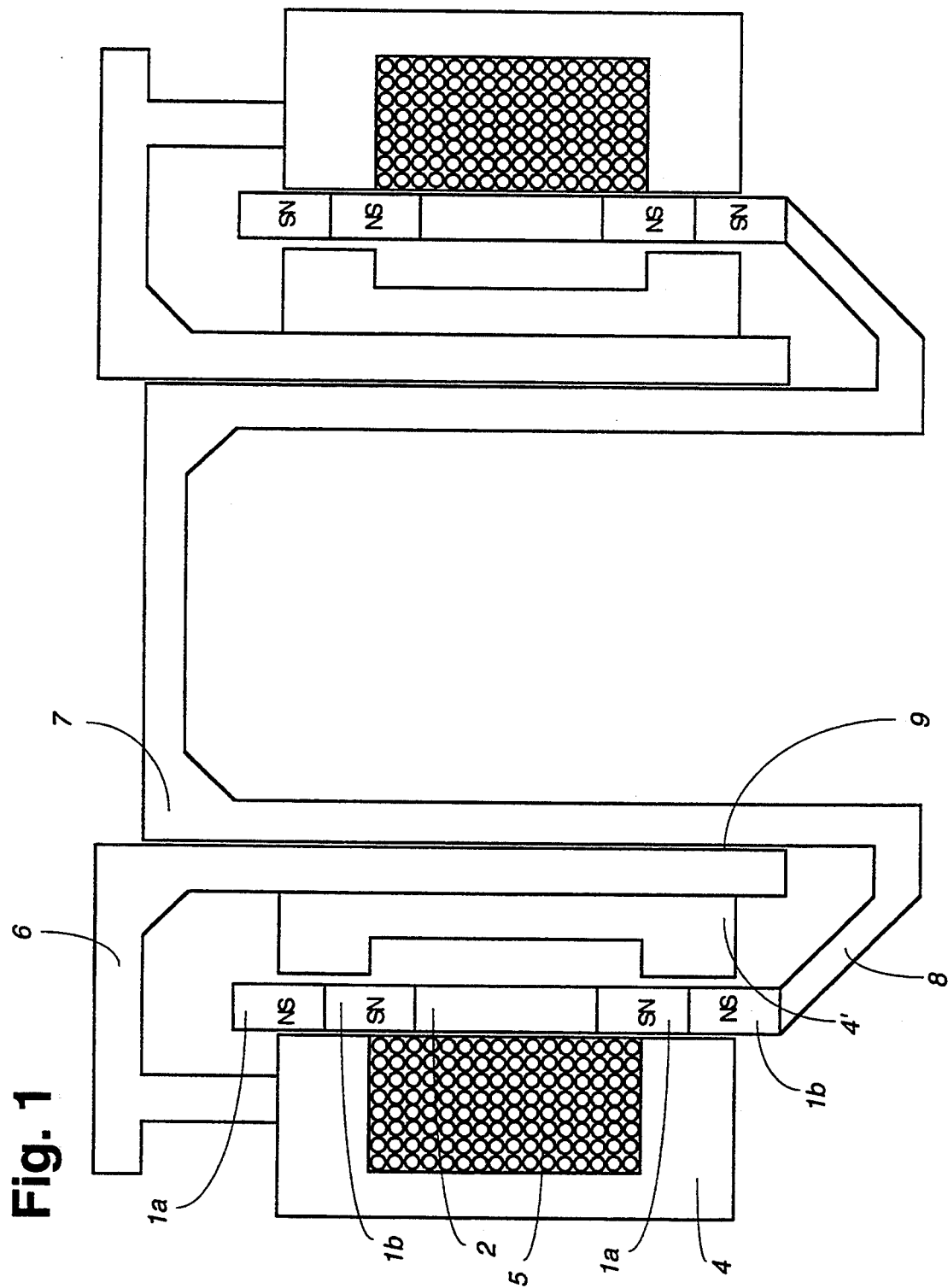
FIG. 1 illustrates in cross section a permanent magnet linear alternator/motor of conventional configuration.

Detailed description of embodiments of the present invention will be given with reference to the drawings.

Linear alternators of the most compact types typically consist of a fixed magnetic circuit surrounded by one or more electrically-conductive coils in which is induced a voltage (and, when connected to an external load, a current), under the influence of moving magnetic flux generators that reciprocate in the gap of the fixed circuit, thereby inducing flux of alternating polarity in the fixed circuit. The flux generators are most commonly permanent magnets, which require no electrical connections to external power sources, as do the alternative electromagnetic flux generators.

As more fully discussed below, the present invention provides for improved permanent magnet alternators and motors having non-axisymmetric, interdigitating interfaces between moving and fixed magnetic circuit elements, resulting in a system with lower mass and size than those previously attainable in linear electrodynamic machines. Also within the scope of the present invention are electromagnetically-excited machines with fixed exciting coils that are similar in simplicity to permanent magnet machines while providing improved controllability, although typically requiring somewhat greater size for a given output rating because of relatively greater flux leakage.

The present invention also enables electromagnetically-excited alternators and motors of comparable flux linking effectiveness compared to permanent magnet machines constructed in accordance with the present invention, thereby enabling the compactness of the present invention's permanent-magnet embodiment to be combined with the less-costly materials and superior controllability of the electromagnetic embodiment, providing yet additional improvements and advantages over prior art machines.

The problem of linking effectiveness is intrinsic in the physically different manner of flux generation between permanent magnetic and electromagnetic excitation machines. In permanent magnet machines, the magnetic flux is an intrinsic property of the magnetic material, and therefore the flux generation can occur exactly where required, i.e., in the gap of the fixed circuit, by placing the magnet as precisely as possible in the gap of the fixed circuit. The magnetic field lines remain substantially within the magnet itself except where they emerge from the pole faces directly adjacent to the fixed circuit.

In electromagnetic machines, two problems can exist. One, the magnetic flux must be generated by the presence of a current in a coil, typically surrounding a magnetically-permeable core material (e.g., iron). Such current requires electrical conductors, wound and connected to external current sources. Moving exciting coils typically necessitate moving electrical connectors such as flexible wires, thereby subjecting the system to potential failure due to breakage of the connectors or wires. Second, the flux created by the exciting coil is not an intrinsic property of the magnetically-permeable material, and therefore tends to be unconfined to that material unless fully wrapped with the coil (that is, with no exposed surfaces except at the desired poles).

The first problem has led to prior electromagnetically-excited linear alternators with fixed exciting coils, eliminating the need for moving electrical connectors to the plunger. This was crucial in earlier gas-bearing designs, where the lack of rotational positioning precluded any direct connections (such as flexible wires) that could twist and fail if the plunger rotated. Rubbing contacts are theoretically possible in such a design, but rubbing contacts are incompatible with the long service life required for these machines, as they tend to wear away with friction.

The use of fixed exciting coils tends to leave elements of the magnetically-permeable core material on the plunger uncovered by the coil, as necessarily clearance must be provided for relative reciprocation, and fixed coils cannot readily be located directly in the air gap of the fixed magnetic circuit where the plunger poles must be. The resulting flux leakage tends to reduce the effectiveness of the exciting flux and reduces the obtainable power output.

To achieve the same high level of flux linking in electromagnetic embodiments as demonstrated with permanent magnets, it therefore is preferred to: (1) fully and closely surround the magnetically-permeable core material of the plunger with the exciting coils to the extent possible; and (2) position the resulting electromagnet as precisely as possible in the gap of the fixed circuit.

The implication of the above is that the surrounding coils of the exciting electromagnet must be positioned directly around the moving flux concentrators, that is on the plunger's magnetically-permeable parts. Such positioning tends to re-introduce the problem of electrical connection of the exciting coils presented in earlier, free-to-rotate, gas-bearing machines. With the present invention, however, such connections may be made in direct, non-rubbing, and cost-effective ways by, for example, adapting the flexible suspension elements used with the interdigitating or "star" plunger geometry disclosed herein to serve also as the electrical connections for the moving exciting coils on the plunger. As will be appreciated, such an embodiment of the present invention combines the compactness of the permanent-magnet interdigitating "star" plunger with the low-cost materials and controllability of electromagnetic excitation alternators and motors.

Alternatively, in operative conditions such as very high temperatures or reciprocation frequencies, conditions in which reciprocating coils are themselves unacceptable apart from any concerns about their electrical connections, an embodiment of the present invention provides for fixed excitation coils, at some increase of mass and size due to increased flux leakage, but retaining the other advantages of the present invention as described herein.

Referring now to FIGS. 2–17, embodiments in accordance with the present invention now will be further described.

Referring to FIG. 2, in one embodiment of the present invention, plunger assembly 8 is provided with an even number of substantially flat, rectangular permanent magnets 1 arranged in a radially-extending or "star" configuration spaced around a smaller diameter reciprocating plunger core 2. In the illustrated embodiment, permanent magnets 1 comprise two sets of magnets arrayed in an axially adjacent manner, and mounted to common core 2, but having oppositely-directed fields (see also FIG. 4). Within each such set, permanent magnets 1 are aligned with their dipoles in alternating substantially circumferential directions such that each side face 3 of a radially extending magnet is a magnetic pole with the same polarity as the opposite (nearer) face of the circumferentially-adjacent magnet. As more fully described below, plunger assembly 8 reciprocates in an interdigitating manner with the fixed portions of the magnetic circuit, thereby enabling alternators and motors having the benefits and advantages described herein.

FIG. 2a illustrates an electromagnetic plunger assembly 8' used in alternative embodiments of the present invention. Analogous to plunger assembly 8 of FIG. 2, plunger assembly 8' comprises electromagnets 1' arranged in a radially extending or "star" configuration spaced around a smaller diameter reciprocating plunger core 2'. Side faces 3' are configured similar to side faces 3 of FIG. 2. It can be seen that in this alternative embodiment an even number of substantially flat, rectangular electromagnets 1' (each consisting of a magnetically-permeable material wrapped with an electrically-conductive coil) are arranged in a substantially radially-extending configuration spaced around small diameter plunger core 2'. As more fully illustrated in FIG. 5, two sets of magnets 1' are so arrayed, axially adjacent and mounted to a common core, but having oppositely-directed fields. Within each such set, magnets 1' are aligned with their dipoles in alternating substantially circumferential directions such that each side face 3' of a radially-extending magnet 1' is a magnetic pole with the same polarity as the opposite (nearer) face of the circumferentially-adjacent magnet 1'.

Referring to FIG. 3, while the lamination-stack-coil assembly (illustrated in FIG. 6) is explicitly illustrated with the permanent magnetic plunger embodiment of FIG. 2, it is to be understood that the electromagnetic plunger embodiment of FIG. 2a is utilized in a similar manner in alternative embodiments in an analogous manner.

Thus referring to FIG. 3, it is seen that each axially-adjacent pair of magnets 1/1' (either magnets 1 of FIG. 2 or magnets 1' of FIG. 2a) fits between two adjacent poles 14 of lamination stack 15 around each of which a coil 16 of an electrical conductor is wound. This interdigitating interface of the present invention conducts the flux lines (illustrated by the dashed lines in FIG. 3) of each magnet 1 or 1' through two coils 16, thereby requiring less magnet mass for a given total flux linkage and thereby output power. Coils 16 are alternatively positioned around connecting ligaments of the lamination stack in other embodiments. As illustrated in FIG. 3, passages 29 are formed between coils 16 on adjacent poles 14.

In operation, reciprocation of plunger assembly 8 or 8' switches the magnetic flux direction in laminations 15 by exposing to lamination poles 14 more of one set of magnets 1 or 1' than its oppositely directed, axially-adjacent counterpart. With the present invention no back iron is required to carry flux-loops and only two air gaps 37 occur in each loop, both optimally adjacent to permanent magnetic material. To provide the optimum close air gap 37, plunger assembly 8 or 8' must be supported by a radially and torsionally stiff suspension, such as the suspension system disclosed in copending application Ser. No. 07/609,811. "Star" plunger assemblies 8 and 8' are structurally far stronger than typical conventional designs, since small magnetic elements 1 and 1' are radially attached to a stable core 2 or 2'. Core 2 or 2' is outside the magnetic flux paths and therefore does not see changing flux and thus can be made of strong materials, for example, steel, without inducing eddy-current losses.

Figure 4:
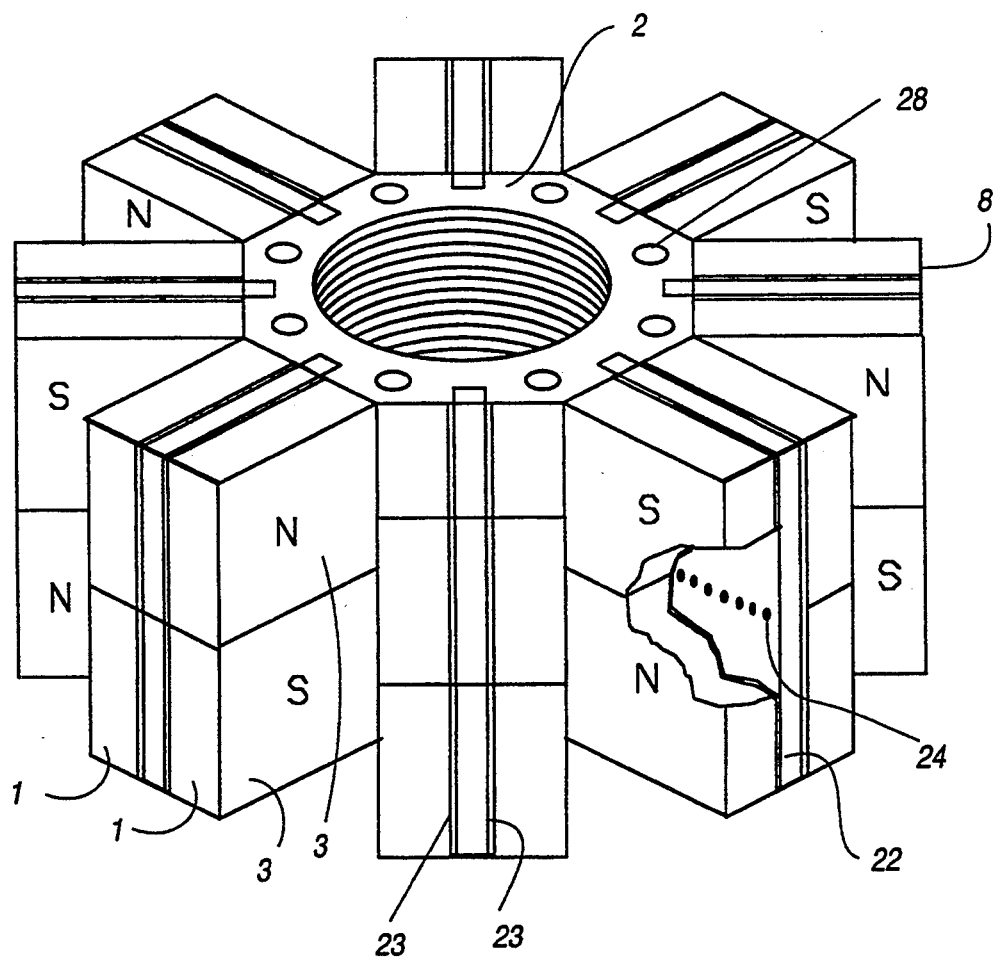
FIG. 4 is a detailed perspective view of a permanent magnet plunger assembly in accordance with the present invention.

Referring now to FIG. 4, plunger assembly 8 of FIG. 2 will be described in greater detail. Plunger assembly 8 consists of core 2 of low magnetic permeability (e.g. aluminum), typically tubular in construction for minimum mass, into which are fitted and attached rays 22, which preferably are of high magnetic permeability and structural strength (e.g., steel). Such attachment may be made by any suitable method, such as dovetails, brazing or adhesive bonding (adhesive bonding is illustrated in FIG. 4), or by any suitable mechanical fasteners. Core 2 is adapted for reciprocatingly-free attachment to a torsionally and radially stiff suspension by provision of mounting holes 28. Permanent magnets 1 are then bonded to both faces of rays 22 with adhesive 23. Permanent magnets 1 are axially substantially equal to the stroke length of plunger assembly 8.

Permanent magnets 1 are adhered to rays 22 with matched polarity in magnets 1 positioned directly across ray 22 from each other. Permanent magnets 1 are arranged with opposite polarity from those axially adjacent on each side of rays 22. Permanent magnets 1 are arranged on rays 22 to provide for like polarity of magnet faces 3 with respect to the nearest exposed face 3 on the circumferentially-adjacent ray 22. To minimize self-canceling flux leakage between magnets 1 of opposite polarity and axially adjacent on a common ray 22, ray 22 preferably is perforated with holes 24 or otherwise reduced in cross-section or permeance to reduce the magnetically-permeable path between axially-adjacent magnets 1. For example, the reduced permeance middle portion of ray 22 may be a strip of low permeability stainless steel or other suitable material brazed or otherwise connected to high permeability materials to produce a composite ray 22.

Figure 3A:
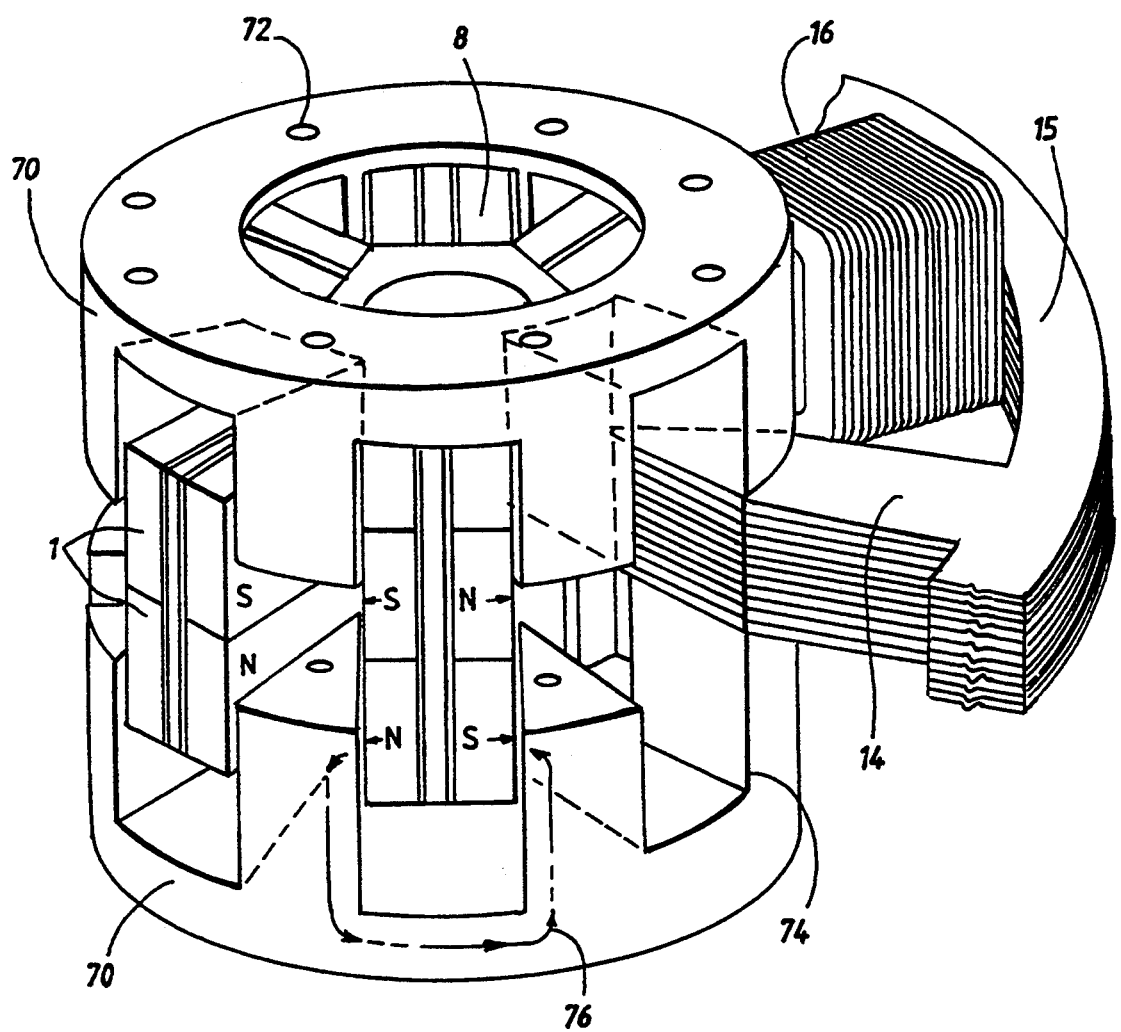
FIG. 3a is a partial sectional view illustrating the embodiment of the present invention of FIG. 3 with keeper rings.

FIG. 3a illustrates a partial isometric view of the permanent magnet alternator/motor assembly discussed in connection with FIGS. 3 and 4. In particular, FIG. 3a illustrates the use and position of keeper rings 70 in relation to the magnets 1 and poles 14 of lamination stack 15. One array of magnets 1 is removed to show the contact between keeper rings 70 and lamination pole 14. Keeper rings 70 are attached to each other through the tips of poles 14 by means such as pins or screws through mounting holes 72. Keeper rings 70 are generally tubular in shape, with radial notches 74 cut through from one end as indicated. The width of notches 74 is substantially the same as the space between adjacent poles 14 on laminations 15. The depth of notches 74 is substantially equal to the maximum stroke of plunger assembly 8. The number of notches 74 is equal to the number of poles 14 on laminations 15, so that, when keeper rings 70 are assembled over lamination stack 15, notches 74 are aligned with and constitute extensions of the gaps between poles 14 wherein magnets 1 reciprocate.

Plunger assembly 8, carrying magnets 1, is shown at its mean position, where approximately half the axial extent of each layer of magnets 1 is axially aligned with laminations 15, and the other halves of magnets 1 are axially aligned with the notches 74 of keeper rings 70. In this position, there is no net flux in laminations 15.

Magnetic polarity is indicated for some of the faces of the magnets 1 as "N" or "S", representing north and south magnetic poles, respectively. A typical flux line 76 is shown for a portion of magnet 1 not aligned with lamination pole 14, but rather with keeper ring 70. At the extremes of stroke position of plunger assembly 8, one layer of magnets 1 is substantially entirely within the notches 74 of one keeper ring 70, and the other layer of magnets 1 is substantially entirely axially aligned with the lamination stack 15, providing maximum net flux therein.

The flux from magnets 1 is substantially fully contained within the assembly at all times, either in the laminations 15 or the keeper rings 70, minimizing the stray flux that, in changing with position of the magnets 1 during operation, would otherwise cause undesirable hysteresis loss in external ferromagnetic components in the vicinity of the alternator. Keepers such as keeper rings 70 also may be used with electromagnetic plunger assemblies such as plunger assembly 8' of FIG. 2a.

Figure 5:
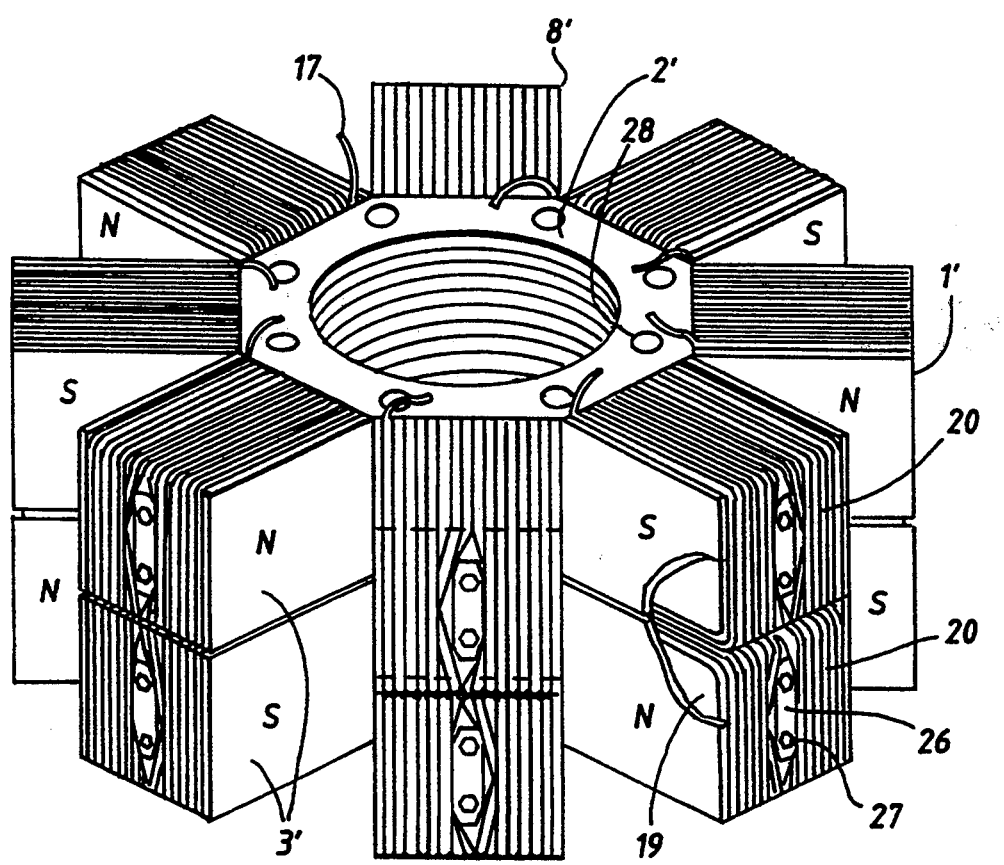
FIG. 5 is a detailed perspective view of an electromagnetic plunger assembly in accordance with the present invention.

Referring now to FIG. 5, plunger assembly 8' of FIG. 2a will be described in greater detail. Plunger assembly 8' consists of core 2' of low magnetic permeability, which typically is tubular in construction to minimize mass. Core 2' likewise is adapted for reciprocatingly-free attachment to a radially and torsionally stiff suspension by provision of mounting holes 28. Attached to the side thereof, by means of mechanical fasteners such as bolts 27 or the like, are magnetic flux generators, which in this embodiment are electromagnets 1'. Electromagnets 1' consist of magnetically permeable cores 19 wound substantially all over (except at intended pole faces 3' and bolting areas 26) with coils 20 of electrically conductive wire. Coils 20 are provided with leads 17 for connection to an external source of direct-current electric power.

Electromagnets 1' are arranged in a manner similar to permanent magnets 1 illustrated in FIG. 4, with opposite polarities between adjacent magnets 1' both axially and circumferentially. Polarities are indicated in the figure by the letters N and S, representing north and south magnetic pole faces, respectively, at the surfaces so labelled.

Figure 6:
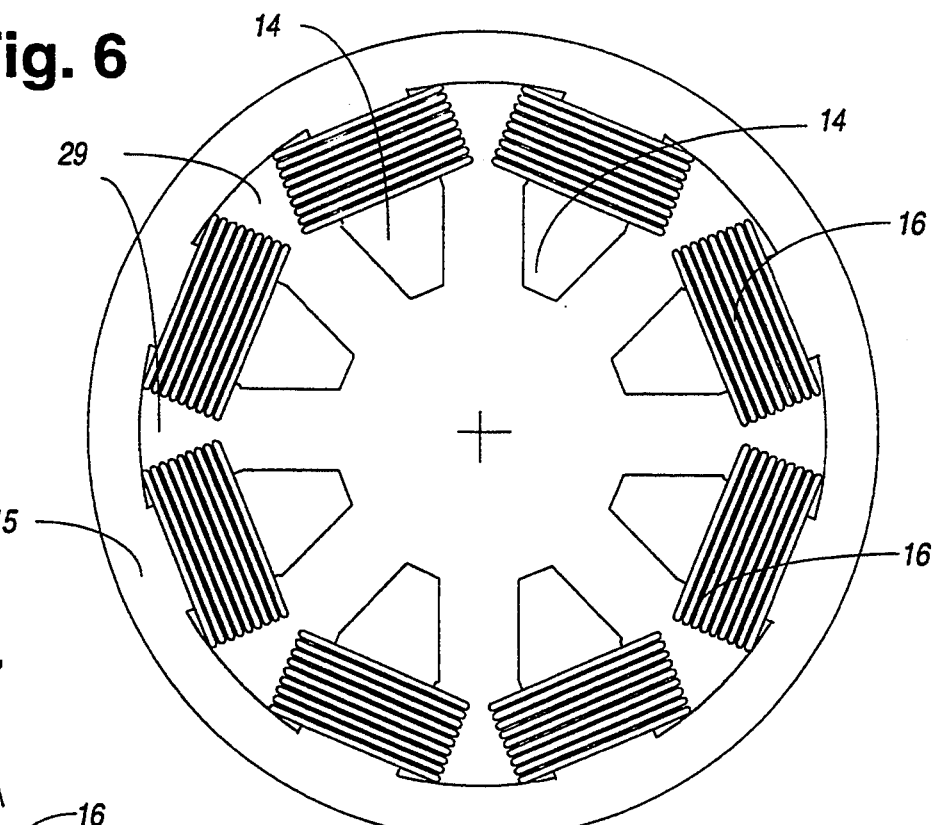
FIG. 6 is an end view of the lamination-stack-coil assembly in accordance with an embodiment of the present invention.

FIGS. 6-9 illustrate in greater detail aspects of certain embodiments of the present invention. In FIG. 6, lamination stack 15 has an even number of poles 14 extending radially inward. Around each pole 14 of lamination stack 15 a coil 16 is wound. The open space defined by lamination stack 15 and coils 16 on poles 14 are passages 29 as illustrated in FIG. 6. The assembly illustrated in FIG. 6 may be used with plunger assembly 8 or 8' as was discussed with reference to FIG. 3.

Figure 7:
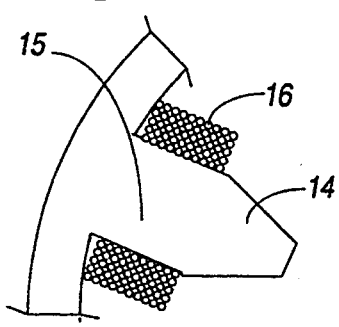
FIG. 7 is a fragmentary section view of section A-A' of FIG. 9.
Figures 9, 10, 11:
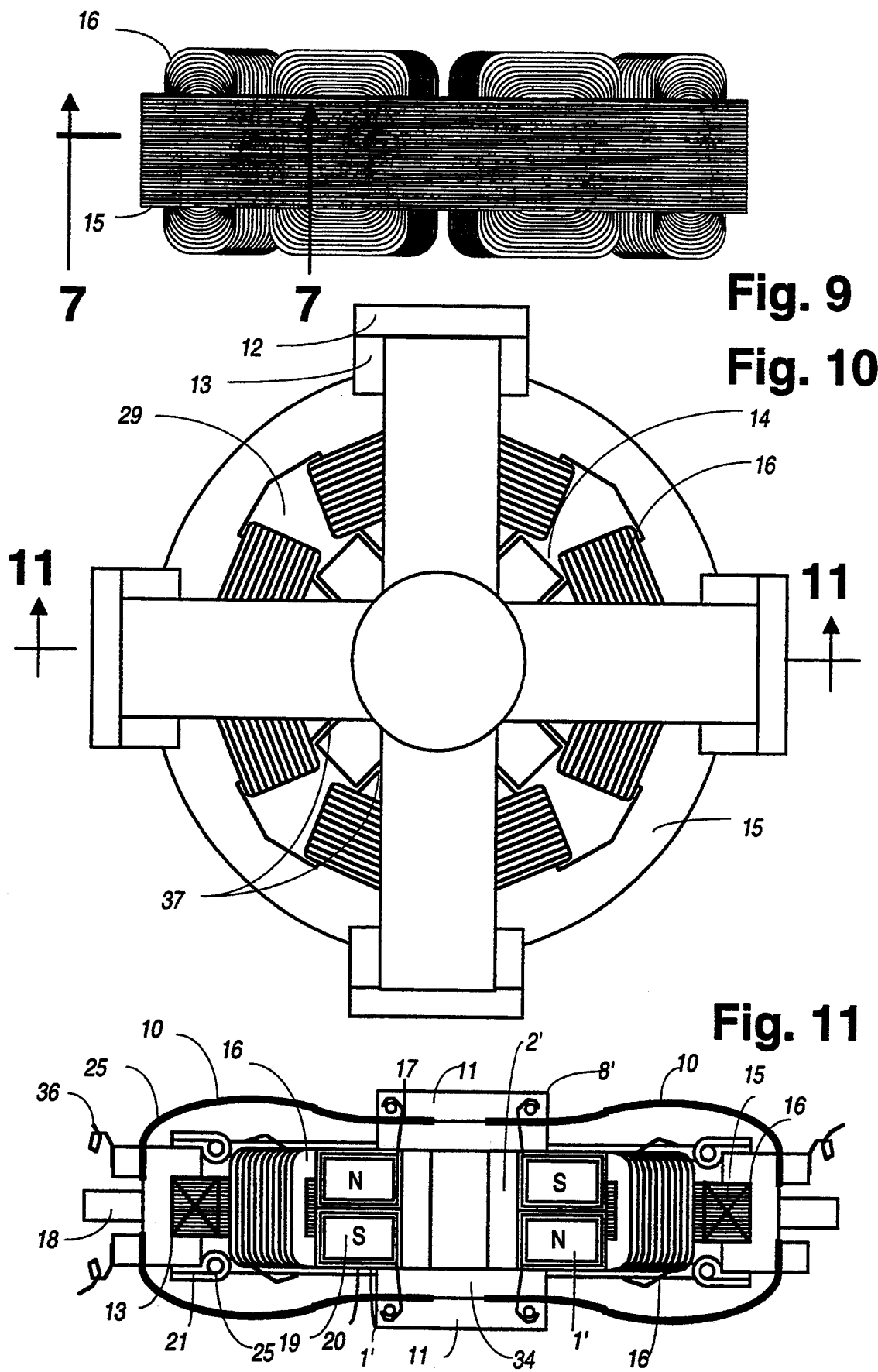
FIG. 9 is an exterior side view of the lamination-stack-coil assembly in accordance with an embodiment of the present invention.
FIG. 10 is a partial assembly view of an electromagnetic alternator/motor assembly also illustrating flexible mounting of the plunger in accordance with an embodiment of the present invention.
FIG. 11 is a sectional view of section A–A' of FIG. 10.

FIG. 9 provides a perspective view of a lamination stack assembly consisting of coils 16 wound on poles (such as poles 14 of FIG. 6) of lamination stack 15. FIG. 7 illustrates a partial sectional view of the assembly of FIG. 9 along line A-A'. As illustrated in FIG. 7, coils 16 comprising coiled electrical conductors are wound around poles 14 of lamination stack 15.

Figure 8:
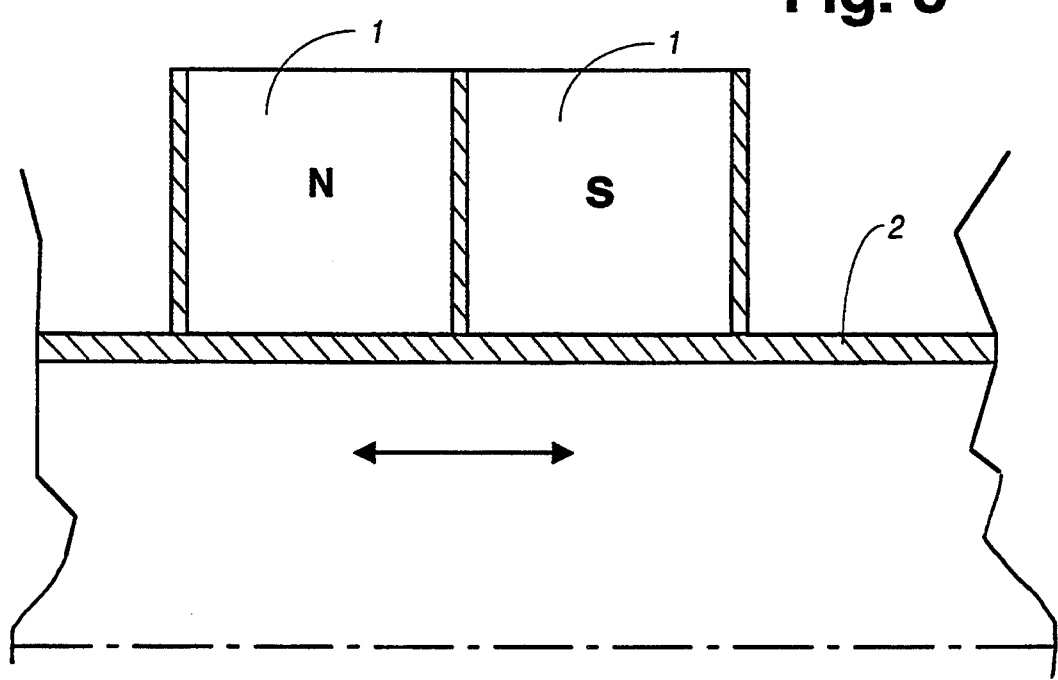
FIG. 8 is a fragmentary extension side view of section B-B' of FIG. 2.

Referring now to FIG. 8, magnets, such as magnets 1 illustrated in FIGS. 2 and 4, are fixed on plunger core 2. For purposes of further reference and understanding, the arrow of FIG. 8 indicates the direction of travel of magnets 1 and plunger core during linear reciprocation.

With reference now to FIGS. 10 and 11, a longitudinal section through the axis of reciprocation of an electromagnetic embodiment according to the present invention will now be described. Each magnet 1' is constructed of core 19 of magnetically-permeable material (e.g., iron) wound tightly and substantially completely over its entire thickness with coil 20 of electrically-conductive material (e.g., copper). Lead wires 17 from coils 20 are attached to bus bars 11 at each end of plunger core 2', and to each other in sequence and respecting of the winding direction of each coil 20, so as to produce, when a voltage difference is applied from bus bar 11 at one end of plunger core 2' to the bus bar at the opposite end of the plunger, the aforementioned opposite magnetic polarity in each magnet of each pair of axially-adjacent magnets and in each axially-adjacent pair. Bus bars 11 are electrically isolated from each other and from plunger core 2' and magnets 1' by insulator plates 34. Thin, wide, and substantially planar (when relaxed), flexible suspension elements (or "flexures") 10, of electrically-conductive material are attached to the ends of plunger core 2' by clamping between insulator plates 34 and bus bars 11, which electrically connect flexures 10 at each end of plunger assembly 8' to the respective ends of coils 20 of magnets 1'. Flexures 10 are clamped at their outer ends to the fixed parts of the alternator, specifically lamination stack 15, through electrically-insulating clamp blocks 13 (which are affixed to lamination stack 15) by the clamping of bus blocks 12, which are electrically-conductive.

Bus blocks 12 are provided with electrically-conductive leads 36 for connection to an external source of direct-current electricity to energize magnets 1'. The external source may be modulated to alter the resulting field strength of electromagnets 1', and thereby control the power output of the present alternator invention (or the reciprocation stroke when the unit is used as a motor, with an AC source on coils 16 and movement of plunger assembly 8' is taken as output). Bus rings 25, attached to lamination stack 15 with electrically-insulating brackets 21, are provided for the connection of coils 16, to act as collectors and output terminals for the induced voltages (and, if connected to a load, currents) in the output coils. The lamination stack 15 is attached to a suitable fixed mounting through pins 18.

In operation, reciprocating force applied axially to plunger assembly 8' (from external means such as the pressure on a piston), causes plunger core 2' to reciprocate, flexing suspension flexures 10, and moving, oppositely-polarized layers of magnets 1' into alternating adjacency with lamination stack 15. The linkage of flux from the alternating polarity of layers of magnets 1' produces reversing magnetic flux in laminations 15. The reversing flux induces alternating voltage across each output coil 16, which, when connected across an electrical load, causes current to flow and electric power to be produced from the applied mechanical force. Alternatively, as will be appreciated by one skilled in the art, the present invention can be used also as a motor to produce reciprocation of plunger assembly 8', by application of AC electrical power to coils 16 via bus rings 25 and by application of DC electric power to coils 20 via leads 36 and flexures 10.

It can be seen, particularly with reference to FIG. 10, that the present invention addresses the problem of flux leakage from electromagnets (such as magnets 1') in the plunger (such as plunger assembly 8') of a linear (reciprocating) alternator by constructing the electromagnets as fully-wound bars exactly and only in the air gap of the fixed magnetic circuit, with only the desired pole faces exposed from the enclosing coils and with those pole faces immediately adjacent to the poles of the fixed magnetic circuit. The present invention also solves the problem of the supply of electrical power to the coils of such electromagnets, which are necessarily plunger-mounted and reciprocating therewith, by adaptation of the flexible suspension (such as flexures 10), which already are utilized in the operation of the interdigitating plunger and laminations of the star-type alternator, to serve as connecting conductors between those coils and the fixed parts of the alternator, where conventional electrical connections to external sources of power are readily made in known manner.

Figure 12:
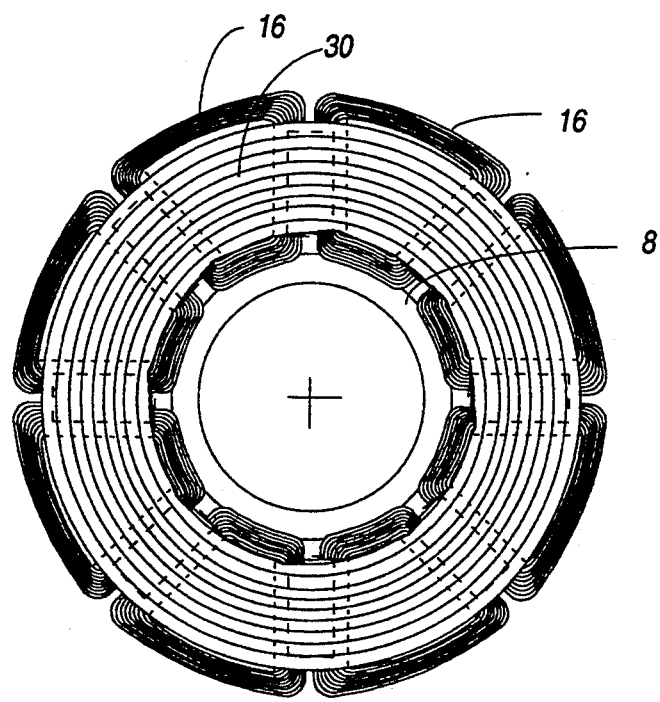
FIG. 12 is an end view of an alternator/motor assembly in accordance with an embodiment of the present invention.
Figure 13:
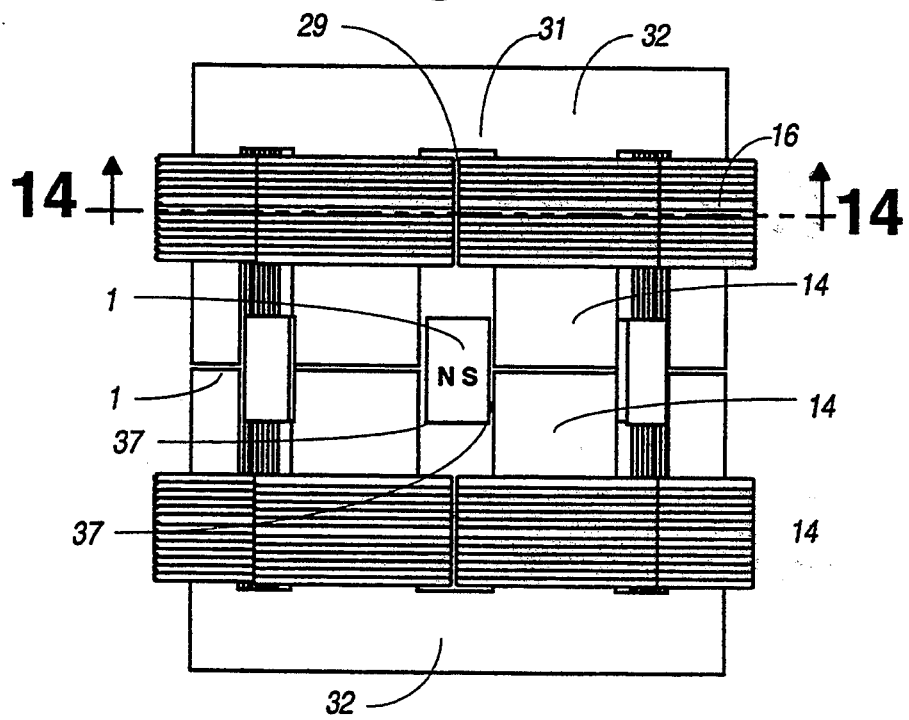
FIG. 13 is an exterior side view of a substantially concentric lamination assembly in accordance with the embodiment of the present invention illustrated in FIG. 12.
Figure 14:
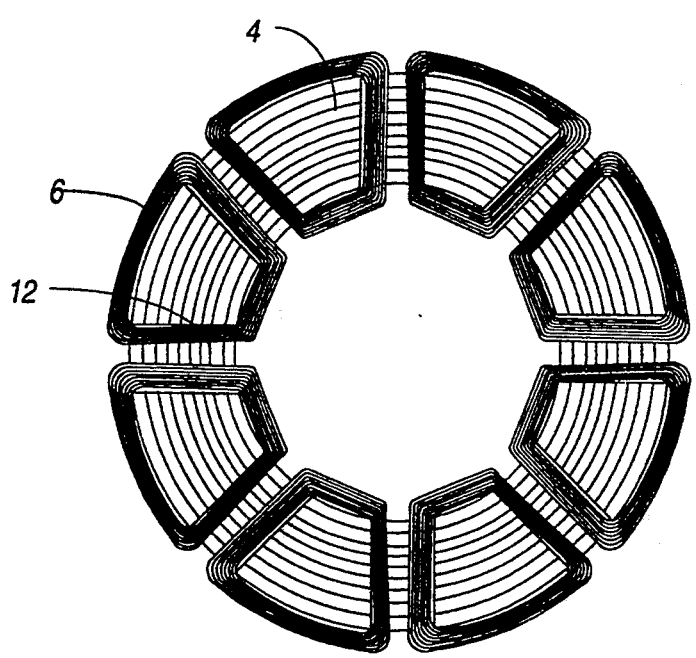
FIG. 14 is an end sectional view along line C–C' of FIG. 13.
Figure 15:
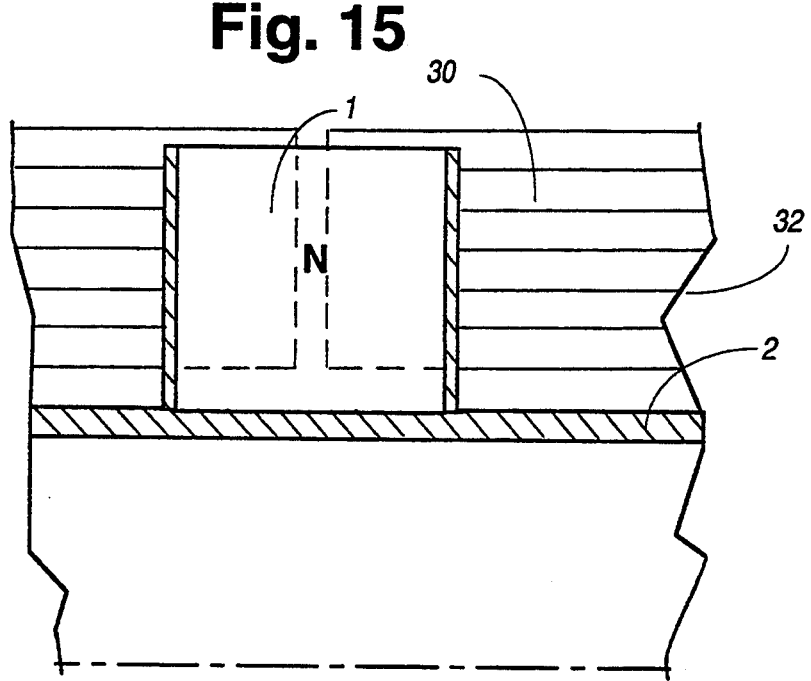
FIG. 15 is a fragmentary plan view of section B–B' of FIG. 2 in accordance with the embodiment of the present invention illustrated in FIG. 12.

Another embodiment of the present invention is illustrated in FIGS. 12-15. In this embodiment, rectangular permanent magnets 1 (or electromagnets 1', etc if in an electromagnetic embodiment) also are arranged in a radially-extending configuration spaced around a small diameter reciprocating plunger core 2 or 2'. As illustrated in FIGS. 13 and 15, this embodiment uses only one set of magnets 1 or 1', which are arranged in a similar manner as one layer of magnets in the previous embodiments illustrated in FIGS. 2-11. At the mid-stroke position, the single layer of magnets 1 is substantially positioned midway between two axially-adjacent lamination bundles 32 as illustrated in FIG. 15. The dipoles alternate in substantially circumferential directions such that each side face 3 or 3' of each radially-extending magnet 1 or 1' has the same polarity as the opposite (rearer) face of the circumferentially adjacent magnet 1 or 1'.

In this embodiment, as illustrated in FIGS. 12 and 14, laminations 30 are substantially circumferential or concentric and poles 14 extend axially to interdigitate with magnets 1 or 1' of star-plunger assembly 8 or 8'. Electrically conducting coil 16 is wound around each of axially extending poles 14. As in the earlier embodiments, it is also possible to wind the coils around connecting sections 31 of lamination bundle 32 between poles 14. In operation, the flux direction switches between one pair of poles 14 and the axially adjacent pair of poles 14 as a result of the reciprocation of magnets 1 or 1' adjacent to the pole pair from one end of the axial stroke to the other end of the stroke. As in the previous embodiments, no back iron is required to carry flux loops and air gaps 37 are optimally adjacent to the permanent magnetic material. The same suspension system as described in copending application Ser. No. 07/609,811 may be utilized with this embodiment. The star plunger assembly 8 and 8' as utilized in this additional embodiment provide similar benefits and advantages over prior art machines.

As is apparent from FIGS. 3, 12, and 13, in the disclosed embodiments passages 29 are provided between coils 16, thereby enabling direct coil and lamination cooling. Lower coil temperature may thus be maintained, allowing higher loading of the magnets without encountering detrimental effects such as demagnetization. As an additional advantage, this allows for a reduction in costly magnet material. Moreover, the present invention allows for coils 16 to be conventionally bobbin-wound before assembly onto poles 14 of lamination stack 15 or lamination bundle 32, thus further reducing the size and ultimate cost of the unit.

As will be appreciated, with the disclosed embodiments of the present invention, the substantially-circumferential orientation of the plunger's magnet dipoles and the interdigitating interface between the plunger and fixed circuit (laminations) provide a fundamentally different geometry than disclosed or practiced in prior art by others such as is disclosed in U.S. Pat. No. 4,349,757 to Bhate, which uses radial magnetization through cylindrical plungers, with flux directed across axisymmetric circumferential air gaps. As will be appreciated, this is not a trivial geometric distinction, as the substantially-circumferential magnet orientation allows for closure of flux loops within planes perpendicular to the reciprocation axis. The devices of Bhate and others use radial flux-loop planes in toroidal magnetic circuits, unlike the present invention. The present invention, allows for flat laminations and externally-wound coils, which are less costly and more compact than the tapered radial laminations and internal coils of, for example, Bhate.

The substantially-circumferential magnet dipoles of the present invention, which utilize radially-extending air gaps that preclude axisymmetric plunger shape, are particularly useful with a torsionally-stiff plunger suspension (such as disclosed herein and in application Ser. No. 07/609,811), to avoid plunger-lamination rubbing. Such torsional stiffness has not been a feature of prior art fluid-film bearing suspensions or dry-rubbing bearings.

A further advantage of the substantially-circumferential magnet dipoles in alternating polarity with circumferentially-adjacent magnets is the feasibility of using keepers (such as keeper rings 70 described in connection with FIG. 3a) to contain stray flux from the magnets' poles when not aligned (axially) with the fixed circuit. Such keeping requires the presence of an alternate permeable path for the plunger magnet flux when the plunger poles are not axially aligned with the fixed circuit. Such a keeper is impractical with prior art devices such as disclosed in Bhate, wherein the plunger connection (to the driving force as an alternator, or the driven element as a motor) is necessarily at one or the other end of the magnetically-active cylindrical section, and so blocks potential keeping across the airgap at that end.

Figure 16:
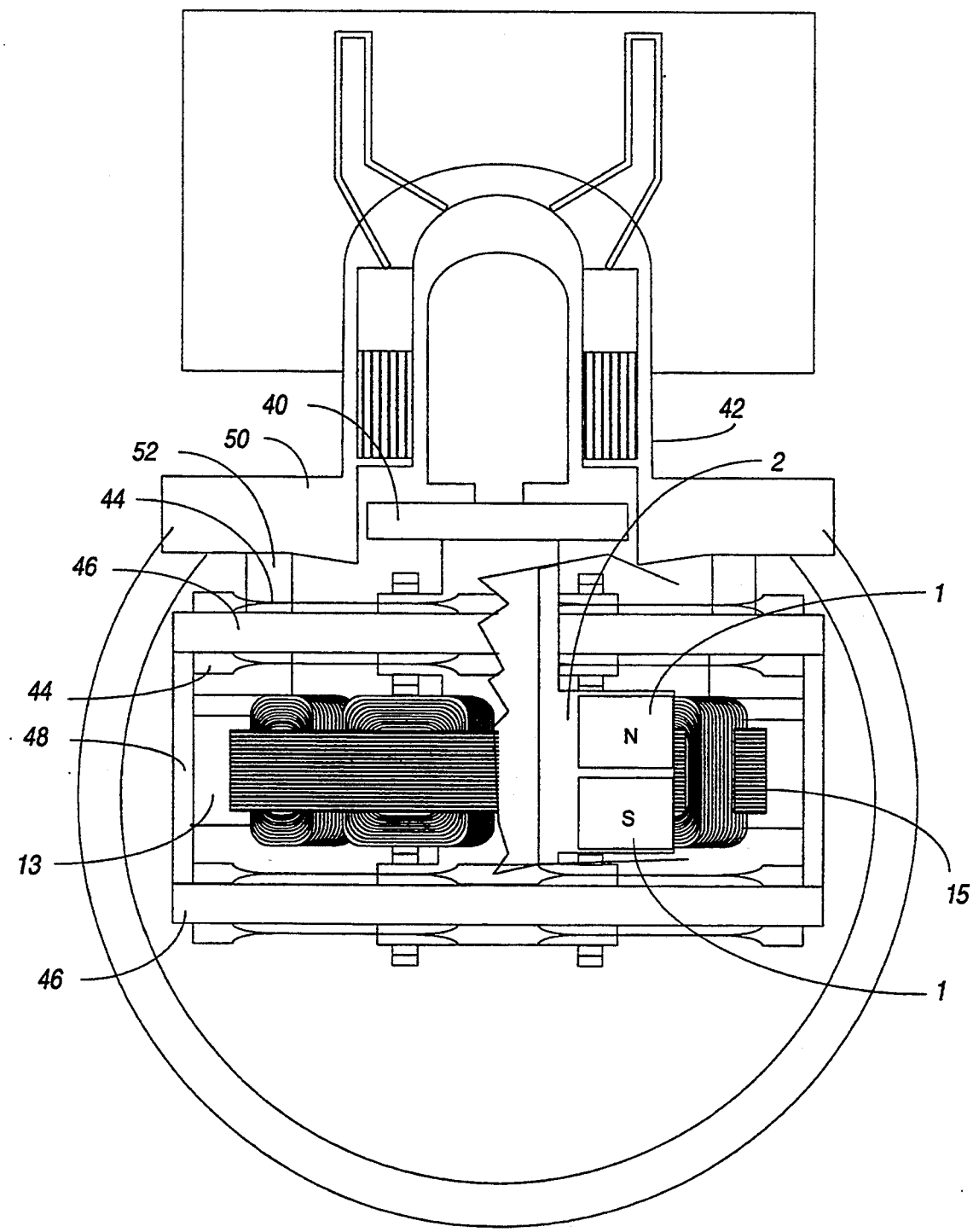
FIG. 16 is a view illustrating the embodiment of FIG. 2 configured as an alternator and connected to a linearly reciprocating piston.

FIG. 16 illustrates the connection between a plunger core such as plunger core 2 and free piston 40 of free piston Stirling engine 42 with the embodiment of the present invention illustrated in FIGS. 2 and 4. When attached to free piston Stirling engine 42 as illustrated in FIG. 16, plunger assembly 8 is directly coupled to piston 40 of engine 42. A flexible suspension consisting of two sets of flexible straps 44 is used to locate plunger assembly 8 within the magnetic circuit (see, e.g., FIG. 3). Plunger assembly 8 consists of magnets 1 mounted on core 2, as previously described.

In the alternate embodiment of the flexible suspension shown (and fully disclosed in copending application Ser. No. 07/609,811), the fixed ends of the flexible straps 44 are attached to two ring structures 46, connected together by frame 48, which is fixedly mounted to main engine casing 50 via support legs 52. Frame 48 also serves as the mounting frame for lamination stack 15 through clamps 13.

Figure 17:
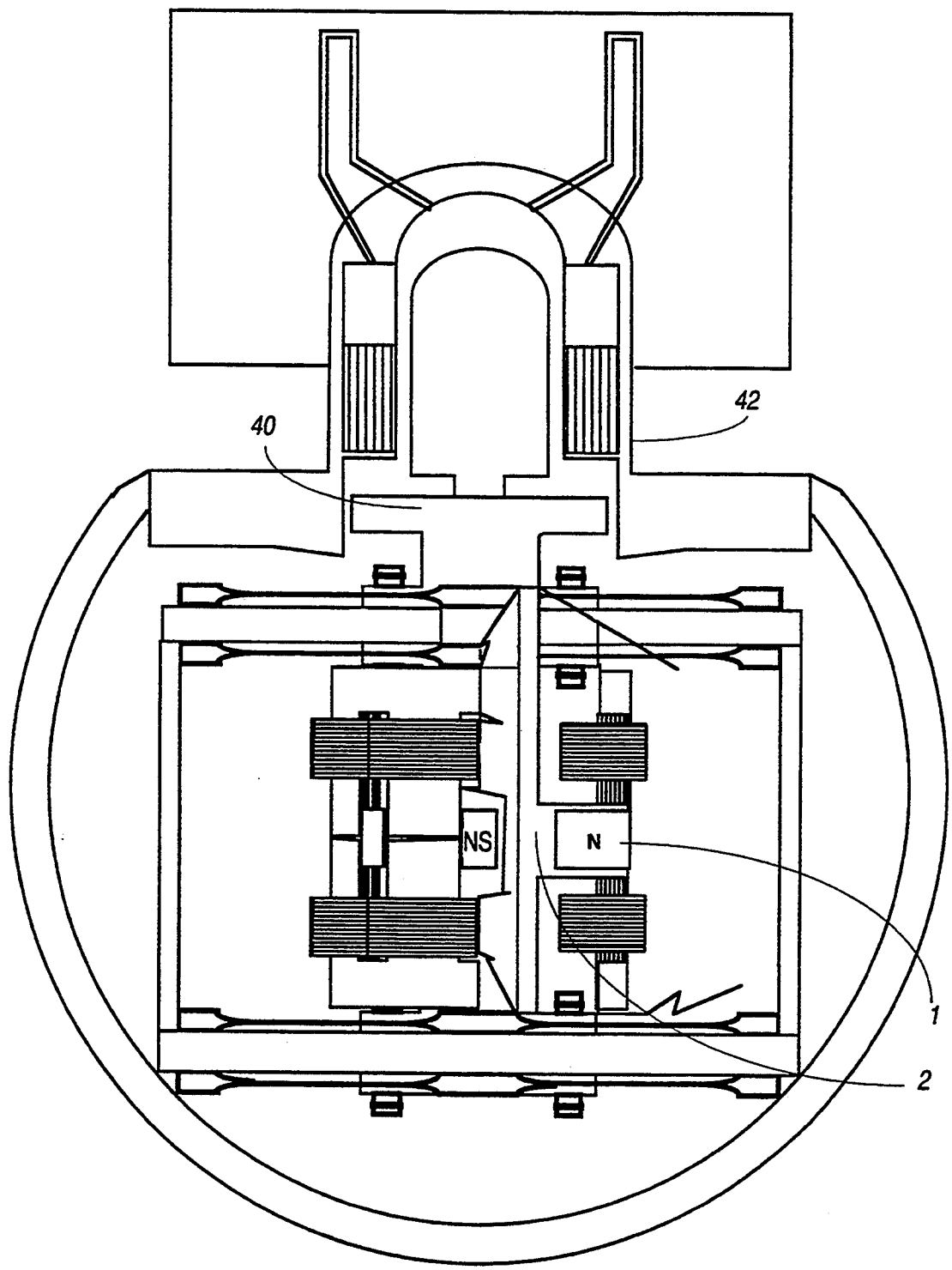
FIG. 17 is a view illustrating the embodiment of FIG. 12 configured as an alternator and connected to a linearly reciprocating piston.

Similarly, FIG. 17 illustrates the connection between plunger core 2 (with magnet 1 mounted thereon) and free piston 40 of the free piston Stirling engine 42, in the embodiment of the present invention illustrated in FIGS. 12-15.

In the embodiment of the present invention illustrated in FIG. 11, electrical connection to the excitation coils may be made by electrically-conductive flexures 10, or alternatively by separate flexible wires or other suitable methods. With the interdigitating arrangement of the present invention, however, an alternator/motor utilizing fixed excitation coils also may be obtained. FIGS. 18-24 illustrate such an embodiment.

In this embodiment, the substantially-circumferential magnet dipole vectors described for the permanent magnet plungers and the electromagnetic equivalent (with fully coil-wrapped permeable material in the same volume as permanent magnets 1; see FIGS. 2 and 2a) are deformed into U-shapes within the same endpoints at the pole faces. Specifically, the dipole vector, which follows the internal flux lines in the magnet is brought from a nominally south face, first axially up away from the laminations plane, circumferentially across to the angular position of the other face, and then back down to the nominally north face. Insofar as the material connecting the south and north faces is continuous and of high magnetic permeability, the flux lines will follow this distorted path from pole to pole rather than through relatively impermeable air gaps that lie along more direct routes. This U-shape necessarily contains axially-extending portions, around which coils fixed to the non-moving portion of the machine can be placed so that the axial extensions of the U-shaped flux paths pass through the coils and so concentrate and carry the electromagnetic flux from the coils, but without actual contact between coil and moving material. The axial extent of the U-shape must be sufficient to allow the full reciprocating stroke before the crossbar portion of the "U" approaches the fixed coil.

The advantages obtained from this embodiment include a more rugged construction, as the moving parts are made from structurally-sound materials like iron and aluminum rather than typically weaker or more brittle permanent magnet materials or composite elements of copper coils and polymer adhesives and electrical insulation. Such construction is well adapted for conditions of extreme vibration or temperature, such as, for instance, space flight. this configuration is, however, not as compact as the permanent magnet or reciprocating coil electromagnetic embodiments because the additional length of plunger included in the U-shaped extensions is necessarily not always fully enclosed by the non-reciprocating coils, allowing a larger portion of the available flux generated by the coils to leak through alternate, parallel paths through surrounding space, and delivering less to the intended magnetic circuit in the fixed parts of the machine.

Figure 18:
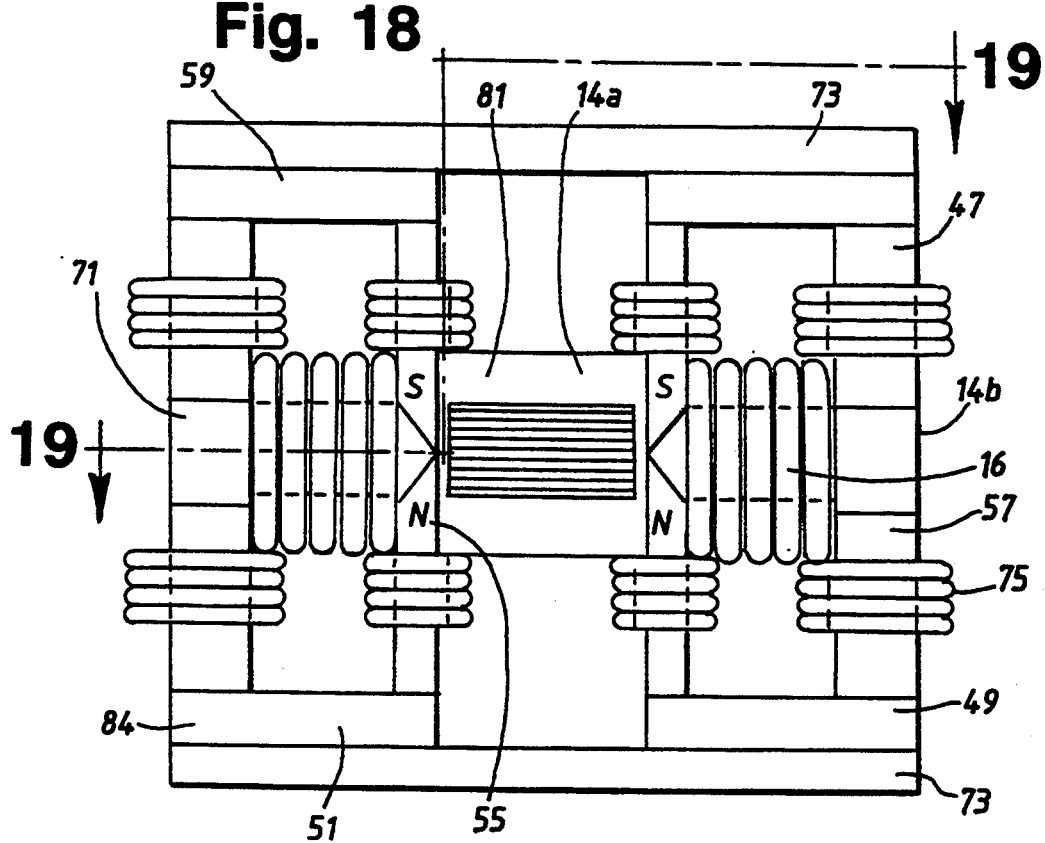
FIG. 18 is a side view of another embodiment of the present invention.
Figure 19:
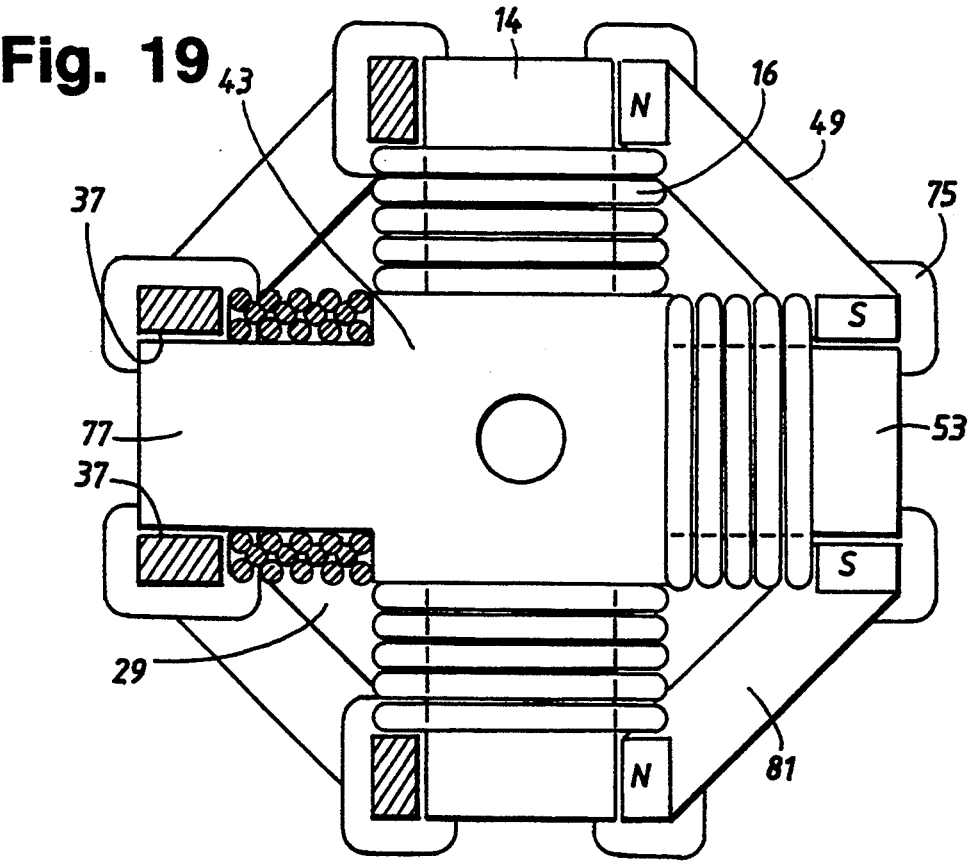
FIG. 19 is a top view with partial section along line A–A' of FIG. 18.

In the embodiment of the present invention illustrated in FIGS. 18 and 19, stator poles 14 are substantially radial projections from common central core 43. Power coils 16 are wound on each of stator poles 14. Reciprocating cage type plunger assembly 47 consists of two sets of substantially u-shaped electromagnets 49 with a first set 51 arranged between stator pole ends 53 in an alignment so as to place only magnetic north poles 55 of the first set 51 adjacent to one stator pole 14a and only magnetic south poles 57 of the first set 51 adjacent to next stator pole 14b and continuing around the stator in this alternating arrangement. Second 59 set of electromagnets 49 is aligned magnetically opposite of the first set and positioned with its poles axially adjacent to those of first set 51. A small amount of low permeability material 71 is used to join the two sections 51 and 59 of cage plunger assembly 47. Each magnet set 51 or 59 also is held together at its extremity by a low permeability connector 73. It is noted that an even plurality of stator poles 14 is required.

Figure 22:
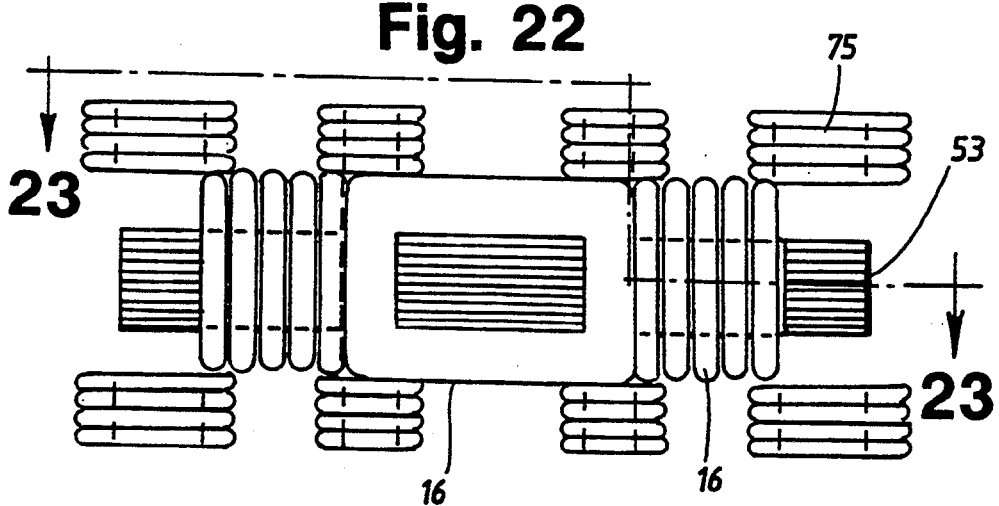
FIG. 22 is a side view of a stator assembly in accordance with the embodiment of the present invention illustrated in FIG. 18.
Figure 23:
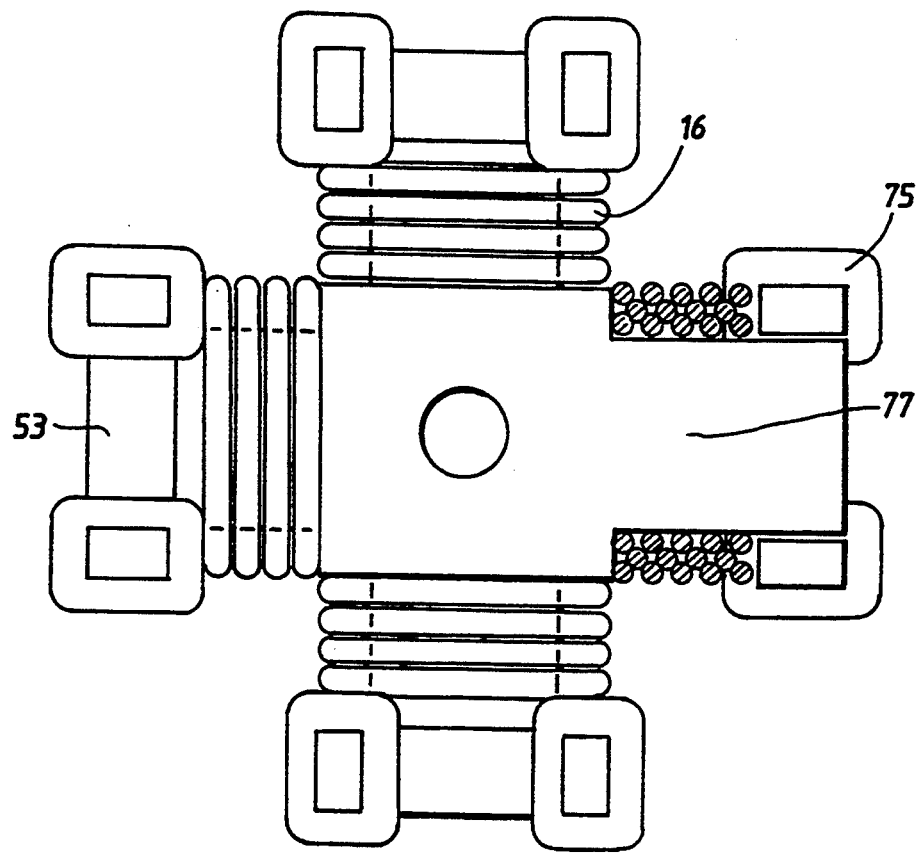
FIG. 23 is a top view with partial section along line B–B' of FIG. 22.

Energizing coils 75 for electromagnets 49 are attached to stator 77 as shown in FIGS. 22 and 23 and positioned with axes parallel to the plunger reciprocation axis and around axial legs 79, shown in FIG. 21, of the reciprocating electromagnets 49 with clearance therebetween to allow non-contacting plunger reciprocation and continuous energizing of plunger electromagnets 49.

In operation the reciprocation of plunger assembly 47 reverses the magnetic flux direction in lamination stack 77 by alternatively exposing stator poles 14 to more of one plunger magnetic pole 55 than its opposite-polarity counterpart 57. Note that there is no back iron required to carry flux loops and only two air gaps 37 occur in each loop. To provide the optimum close air gap 37, plunger assembly 47 must be supported by a radially and torsionally stiff suspension, such as disclosed in application Ser. No. 07/609,811.

Figure 24:
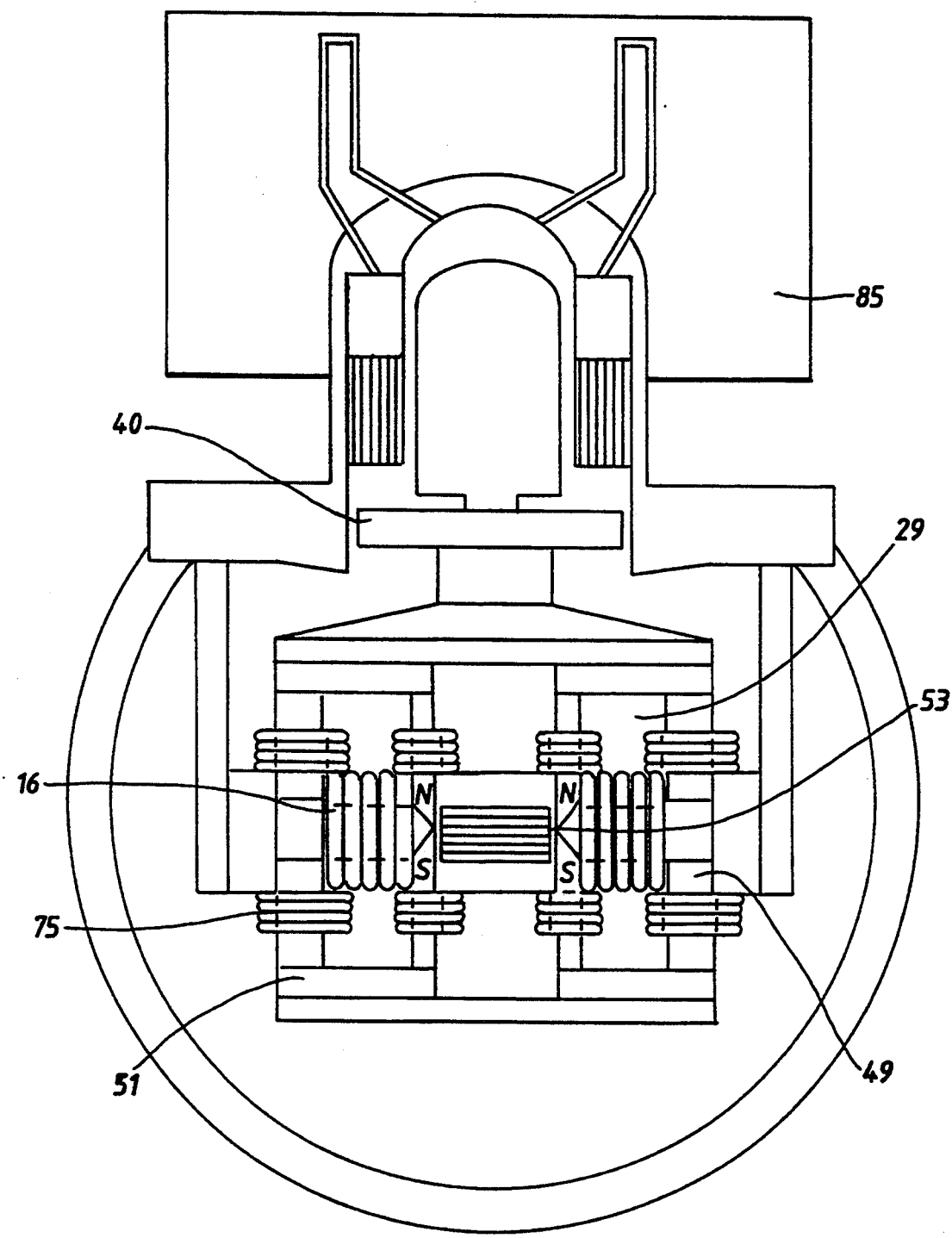
FIG. 24 is a view illustrating the embodiment of FIG. 18 configured as an alternator and connected to a linearly reciprocating piston.

FIG. 24 illustrates the alternator described herein connected to piston 40 of free piston Stirling engine 42.

The cage type plunger assembly 5 illustrated in FIGS. 20 and 21 is structurally very strong and inexpensive to build as it is constructed of durable iron and other common materials in simple shapes.

It can also be seen from FIG. 19, FIG. 20, and FIG. 24 that in the preferred embodiments there are passages 29 between coils 16 to allow for direct cooling of coils 16 and lamination stack 77. Lower coil temperature may thus be maintained. Moreover, the embodiments of the present invention allow for coils 16 to be conventionally bobbin-wound before assembly onto poles 53 of the lamination stack 77, thus further reducing the size and ultimate cost of the unit.

Figure 25A:
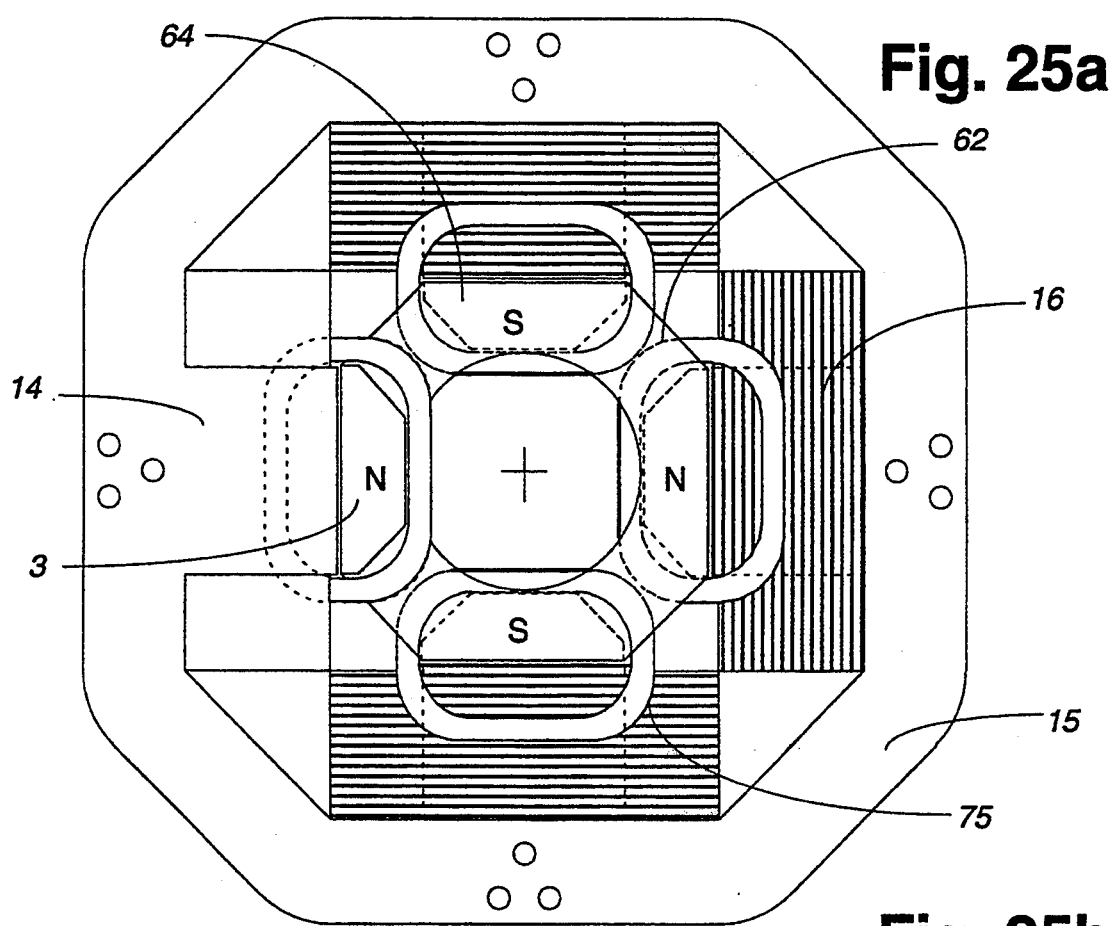
FIG. 25a and FIG. 25b are views illustrating another embodiment of the present invention.
Figure 25B:
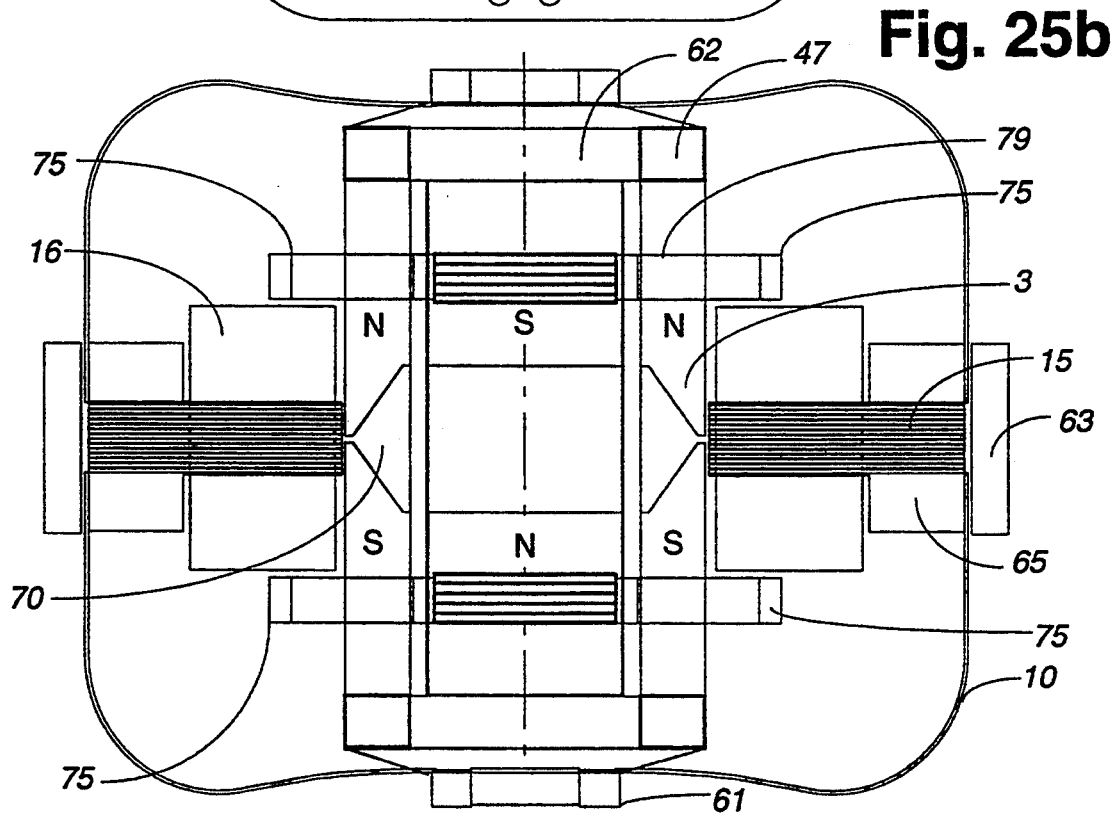

FIGS. 25a and 25b illustrate an other embodiment of the present invention in which the alternator's exciting magnetic flux is provided electromagnetically, and where the coils for those electromagnets are fixed on the stationary parts of the assembly. In like manner to the laminations and coils of FIGS. 6 and 7, laminations 15 are planar, substantially circular with radially-inward-projecting poles 14. On each pole 14 is an output coil 16, provided with suitable terminals and leads (not shown) for connection to an electrical load. Lamination stack 15 also supports DC coils 75, which are aligned with the poles 14 of lamination stack 15, but with axes substantially perpendicular to the planes of laminations 15. Coils 75 are wound and connected in alternating directions, so as to provide alternately opposing electromagnetic dipoles when energized. Plunger assembly 47 consisting of end rings 62 with axial extensions 79 ending in magnetic pole faces 3, all of high magnetic permeability material (e.g., iron), aligned end-to-end axially and joined pole tip to pole tip with intermediate pieces 71 of low-permeability material (e.g., aluminum). When coils 75 are energized with suitable externally-supplied direct electrical current, they induce a magnetic flux in the axial extensions 79 of high-permeability material. Because circumferentially adjacent extensions 79 are surrounded by coils 60 which produce opposite polarity, and because circumferentially-adjacent extensions 79 are joined by high-permeability material in end ring 62, adjacent extensions 79 and the joining segment of end ring 62, are energized in a complementary, reinforcing direction and act together as a single U-shaped bar electromagnet with poles at faces 3.

Plunger assembly 47 can be described as two sets of such U-magnets each arranged with like-polarity legs as extensions 79 joined with the circumferentially-adjacent U-bars, and such joined legs together comprising one layer of plunger assembly 47, with the other, opposite-polarity layer of like form and joined, inverted, tip-to-tip. As in the other disclosed embodiments, plunger assembly 47 is supported for axial reciprocation and prohibited from other degrees of freedom by flexible straps 10, connected between end rings 62 (with clamps 61) and laminations 15 (with clamps 63 and 65). In operation, as plunger assembly 47 reciprocates, layers of oppositely-polarized pole tips 3 come alternately more and less into alignment with laminations 15 at poles 14, causing a reversing flux in laminations 15 and thereby inducing alternating voltages in coils 16, which when connected to suitable electrical load, allows current flow and power output.

In sum, the present invention provides for durable, compact and more cost-effective linear alternators and motors, with alternators in accordance with the present invention particularly well suited for use as a power conversion system with free piston Stirling engines. This use is not intended to be limiting, however, as use with any reciprocating type motive source is obvious.

While the present invention has been described in terms of preferred and alternative embodiments, it will be obvious to one skilled in the art that many alterations and modifications may be made without substantially departing from the spirit of the invention. Accordingly, it is intended that all such alterations and modifications be included in the spirit and scope of the invention as defined by the appended claims.

What is claimed is:

1. An electrodynamic machine comprising:
    a magnetic flux generator reciprocatingly mounted within a magnetically conductive stator ring assembly, the magnetic flux generator comprising a plunger assembly, having a plunger axis, with an even plurality of substantially radially-extending magnets, the magnets being mounted to a central structural core to align interdigitally with an equal plurality of poles on the stator ring assembly, the stator ring assembly having a plurality of electrically conductive coils positioned around portions thereof.

2. The electrodynamic machine of claim 1 wherein the radially-extending magnets comprise permanent magnets arranged in two axially adjacent layers with oppositely directed magnet fields and with each of the layers of the magnets arranged with alternately opposite dipole fields substantially tangential to a circumference about the plunger axis.

3. The electrodynamic machine of claim 1 wherein the radially-extending magnets comprise electromagnets arranged in two axially adjacent layers with oppositely directed magnet fields and with each of the layers of the magnets arranged with alternately opposite dipole fields substantially tangential to a circumference about the plunger axis.

4. The electrodynamic machine of claim i wherein the stator ring assembly comprises axially-stacked laminations, with the poles of the stator ring assembly extending inwardly.

5. The electrodynamic machine of claim 4 wherein at least one of the electrically-conductive coils is positioned around each of the inwardly-extending poles of the stator ring assembly.

6. The electrodynamic machine of claim 5 wherein one or more of the electrically-conductive coils is formed prior to being positioned around one of the inwardly-extending poles of the stator ring assembly.

7. The electrodynamic machine of claim 6 wherein the one or more of the electrically-conductive coils formed prior to being positioned around one of the inwardly-extending poles of the stator ring assembly is formed by a bobbin-wound process.

8. The electrodynamic machine of claim i further comprising suspension means for suspending the magnetic flux generator within the stator ring assembly, wherein the suspension means allows reciprocating motion of the magnetic flux generator within the stator ring assembly while resisting torsional or radial motion of the magnetic flux generator.

9. The electrodynamic machine of claim 8 wherein the suspension means comprises a plurality of flexible straps each having a first and second end, the first end of the flexible straps being in a fixed relationship with the stator ring assembly, and the second end of the flexible straps being in a fixed relationship with the magnetic flux generator.

10. The electrodynamic machine of claim 1 further comprising means for reciprocatingly moving the magnetic flux generator within the stator ring assembly, wherein electrical energy is generated in the electrically conductive coils positioned around portions of the stator ring assembly.

11. The electrodynamic machine of claim 1 wherein the radially-extending magnets comprise electromagnets arranged in two axially adjacent layers with oppositely directed magnet fields and with each of the layers of the magnets arranged with alternately opposite dipole fields substantially tangential to a circumference about the plunger axis.

12. The electrodynamic machine of claim 10 wherein the stator ring assembly comprises axially-stacked laminations, with the poles of the stator ring assembly extending inwardly.

13. The electrodynamic machine of claim 12 wherein at least one of the electrically-conductive coils is positioned around each of the inwardly-extending poles of the stator ring assembly.

14. The electrodynamic machine of claim 13 wherein one or more of the electrically-conductive coils is formed prior to being positioned around one of the inwardly-extending poles of the stator ring assembly.

15. The electrodynamic machine of claim 14 wherein the one or more of the electrically-conductive coils formed prior to being positioned around one of the inwardly-extending poles of the stator ring assembly is formed by a bobbin-wound process.

16. The electrodynamic machine of claim 10 wherein the means for reciprocatingly moving the magnetic flux generator within the stator ring assembly comprises a free piston Stirling engine.

17. The electrodynamic machine of claim 10 further comprising suspension means for suspending the magnetic flux generator within the stator ring assembly, wherein the suspension means allows reciprocating motion of the magnetic flux generator within the stator ring assembly while resisting torsional or radial motion of the magnetic flux generator.

18. The electrodynamic machine of claim 17 wherein the suspension means comprises a plurality of flexible straps each having a first and second end, the first end of the flexible straps being in a fixed relationship with the stator ring assembly, and the second end of the flexible straps being in a fixed relationship with the magnetic flux generator.

19. The electrodynamic machine of claim 11 further comprising suspension means for suspending the magnetic flux generator within the stator ring assembly, wherein the suspension means allows reciprocating motion of the magnetic flux generator within the stator ring assembly while resisting torsional or radial motion of the magnetic flux generator.

20. The electrodynamic machine of claim 19 wherein the suspension means comprises a plurality of flexible straps each having a first and second end, the first end of the flexible straps being in a fixed relationship with the stator ring assembly, and the second end of the flexible straps being in a fixed relationship with the magnetic flux generator.

21. The electrodynamic machine of claim 20 wherein one or more of the flexible straps is conductive and provides electrical energy to one or more of the radially-extending electromagnets of the magnetic flux generator.

22. The electrodynamic machine of claim 1 further comprising means for applying electrical energy to the electrically conductive coils positioned around portions of the stator ring assembly, wherein reciprocating motion of the magnetic flux generator within the stator ring assembly is induced.

23. The electrodynamic machine of claim 22 wherein the radially-extending magnets comprise permanent magnets arranged in two axially adjacent layers with oppositely directed magnet fields and with each of the layers of the magnets arranged with alternately opposite dipole fields substantially tangential to a circumference about the plunger axis.

24. The electrodynamic machine of claim 22 wherein the radially-extending magnets comprise electromagnets arranged in two axially adjacent layers with oppositely directed magnet fields and with each of the layers of the magnets arranged with alternately opposite dipole fields substantially tangential to a circumference about the plunger axis.

25. The electrodynamic machine of claim 22 wherein the stator ring assembly comprises axially-stacked laminations, with the poles of the stator ring assembly extending inwardly.

26. The electrodynamic machine of claim 25 wherein at least one of the electrically-conductive coils is positioned around each of the inwardly-extending poles of the stator ring assembly.

27. The electrodynamic machine of claim 26 wherein one or more of the electrically-conductive coils is formed prior to being positioned around one of the inwardly-extending poles of the stator ring assembly.

28. The electrodynamic machine of claim 27 wherein the one or more of the electrically-conductive coils formed prior to being positioned around one of the inwardly-extending poles of the stator ring assembly is formed by a bobbin-wound process.

29. The electrodynamic machine of claim 23 further comprising suspension means for suspending the magnetic flux generator within the stator ring assembly, wherein the suspension means allows reciprocating motion of the magnetic flux generator within the stator ring assembly while resisting torsional or radial motion of the magnetic flux generator.

30. The electrodynamic machine of claim 29 wherein the suspension means comprises a plurality of flexible straps each having a first and second end, the first end of the flexible straps being in a fixed relationship with the stator ring assembly, and the second end of the flexible straps being in a fixed relationship with the magnetic flux generator.

31. The electrodynamic machine of claim 24 further comprising suspension means for suspending the magnetic flux generator within the stator ring assembly, wherein the suspension means allows reciprocating motion of the magnetic flux generator within the stator ring assembly while resisting torsional or radial motion of the magnetic flux generator.

32. The electrodynamic machine of claim 31 wherein the suspension means comprises a plurality of flexible straps each having a first and second end, the first end of the flexible straps being in a fixed relationship with the stator ring assembly, and the second end of the flexible straps being in a fixed relationship with the magnetic flux generator.

33. The electrodynamic machine of claim 32 wherein one or more of the flexible straps is conductive and provides electrical energy to one or more of the radially-extending electromagnets of the magnetic flux generator.

* * * * *